(12) United States Patent
Sawahashi et al.

(10) Patent No.: US 8,009,748 B2
(45) Date of Patent: Aug. 30, 2011

(54) DOWNLINK CHANNEL TRANSMISSION DEVICE AND METHOD THEREOF

(75) Inventors: Mamoru Sawahashi, Yokohama (JP);
Kenichi Higuchi, Yokohama (JP);
Hiroyuki Atarashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 687 days.

(21) Appl. No.: 11/909,984

(22) PCT Filed: Mar. 28, 2006

(86) PCT No.: PCT/JP2006/306300
§ 371 (c)(1),
(2), (4) Date: Jul. 14, 2008

(87) PCT Pub. No.: WO2006/106674
PCT Pub. Date: Oct. 12, 2006

(65) Prior Publication Data
US 2009/0161772 A1      Jun. 25, 2009

(30) Foreign Application Priority Data
Apr. 1, 2005   (JP) .................................. 2005-106911

(51) Int. Cl.
*H04L 27/28*        (2006.01)
*H04J 3/00*         (2006.01)
(52) U.S. Cl. ........................................ 375/260; 370/345
(58) Field of Classification Search .................. 375/260; 455/561, 562.1; 370/334, 337, 344, 347
See application file for complete search history.

(56) References Cited

U.S. PATENT DOCUMENTS

| | | | |
|---|---|---|---|
| 6,415,163 B1 | 7/2002 | Keskitalo et al. | |
| 6,804,521 B2 | 10/2004 | Tong et al. | |
| 7,099,384 B1 | 8/2006 | Jalali et al. | |
| 7,266,103 B2 | 9/2007 | Anderson et al. | |
| 2003/0162551 A1 | 8/2003 | Atarashi et al. | |
| 2003/0169707 A1 | 9/2003 | Usuda et al. | |
| 2003/0195017 A1* | 10/2003 | Chen et al. | 455/562.1 |
| 2004/0204106 A1* | 10/2004 | Gurelli et al. | 455/562.1 |
| 2006/0217158 A1* | 9/2006 | Uwano et al. | 455/562.1 |

FOREIGN PATENT DOCUMENTS

| | | |
|---|---|---|
| CN | 1440212 A | 9/2003 |
| CN | 1442966 | 9/2003 |
| JP | 2001-127699 A | 5/2001 |

(Continued)

OTHER PUBLICATIONS

Office Action dated May 30, 2008 issued in corresponding Taiwanese Application No. 095111188, 15 pages.

(Continued)

*Primary Examiner* — Khanh C Tran
(74) *Attorney, Agent, or Firm* — Osha • Liang LLP

(57) ABSTRACT

A transmission device able to improve signal quality in a downlink channel is disclosed. The transmission device is for transmitting a control channel, a pilot channel, and a data channel, and includes a unit for transmitting the data channel by using a multi-beam or a variable directional beam, and a unit for transmitting a known signal as the pilot channel by using the multi-beam or the variable directional beam. The multi-beam includes plural fixed directional beams having respective fixed directions different from each other, and the variable directional beam is of a direction changing along with a position of a mobile terminal.

6 Claims, 32 Drawing Sheets

FOREIGN PATENT DOCUMENTS

| | | |
|---|---|---|
| JP | 2002-314481 A | 10/2002 |
| JP | 2003-244054 A | 8/2003 |
| JP | 2003-259454 A | 9/2003 |
| JP | 2004-072539 A | 3/2004 |
| JP | 2005-64546 A | 3/2005 |
| TW | 511382 B | 11/2002 |
| TW | 586279 B | 5/2004 |

OTHER PUBLICATIONS

Abstract for Chinese Publication No. CN1440212 dated Sep. 3, 2003, esp@cenet, 1 page.

Abstract for Taiwanese Publication No. TW586279B dated May 1, 2004, esp@cenet, 2 pages.

Abstract for Taiwanese PublicationNo. TW511382B dated Nov. 21, 2002, esp@cenet, 1 page.

Abstract for Chinese Publication No. CN1442966 dated Sep. 17, 2003, esp@cenet, 1 page.

Office Action issued for Russian application No. 2007136936/09(040402) dated Aug. 10, 2009, and English translation, 8 pages.

L1: "New Polytechnic Dictionary" under the editorship of A.Y. Ishlinsky, Moscow, Scientific publishing house of the Great Soviet Encyclopedia, 2000, p. 204, 2 pages.

Office Action in Japanese Patent Application No. 2005-106911 mailed Nov. 30, 2010, with partial English translation thereof (4 pages).

Patent Abstract in Japanese Publication No. 2002-314481 Publication date Oct. 25, 2002 (1 page).

Japanese Office Action in Japanese Patent Application No. 2005-106911 mailed Feb. 15, 2011, and an English translation thereof (5 pages).

Patent Abstracts of Japan, Publication No. 2004-072539, Publication Date: Mar. 4, 2004 (1 page).

Patent Abstracts of Japan, Publication No. 2001-127699, Publication Date: May 11, 2001 (1 page).

International Search Report issued in PCT/JP2006/306300 dated Jun. 20, 2006, 3 pages.

* cited by examiner

FIG.8

| | TRANSMISSION SCHEME 1 | TRANSMISSION SCHEME 2 | TRANSMISSION SCHEME 3 | TRANSMISSION SCHEME 4 |
|---|---|---|---|---|
| COMMON CONTROL CHANNEL | SECTOR BEAM | SECTOR BEAM | MULTI-BEAM/ SWITCHED BEAM | MULTI-BEAM/ SWITCHED BEAM |
| FIRST COMMON PILOT CHANNEL | SECTOR BEAM | SECTOR BEAM | NO | NO |
| ASSOCIATED CONTROL CHANNEL | SECTOR BEAM | SECTOR BEAM | MULTI-BEAM/ SWITCHED BEAM | MULTI-BEAM/ SWITCHED BEAM |
| SHARED PACKET DATA CHANNEL | MULTI-BEAM/ SWITCHED BEAM | ADAPTIVE DIRECTIONAL BEAM/ MULTI-BEAM/ SWITCHED BEAM | MULTI-BEAM/ SWITCHED BEAM | ADAPTIVE DIRECTIONAL BEAM |
| DEDICATED PACKET DATA CHANNEL | MULTI-BEAM/ SWITCHED BEAM | ADAPTIVE DIRECTIONAL BEAM | MULTI-BEAM/ SWITCHED BEAM | ADAPTIVE DIRECTIONAL BEAM |
| SECOND COMMON PILOT CHANNEL | MULTI-BEAM/ SWITCHED BEAM | MULTI-BEAM/ SWITCHED BEAM | MULTI-BEAM/ SWITCHED BEAM | MULTI-BEAM/ SWITCHED BEAM |
| DEDICATED PILOT CHANNEL | NO | ADAPTIVE DIRECTIONAL BEAM | NO | ADAPTIVE DIRECTIONAL BEAM/NO |

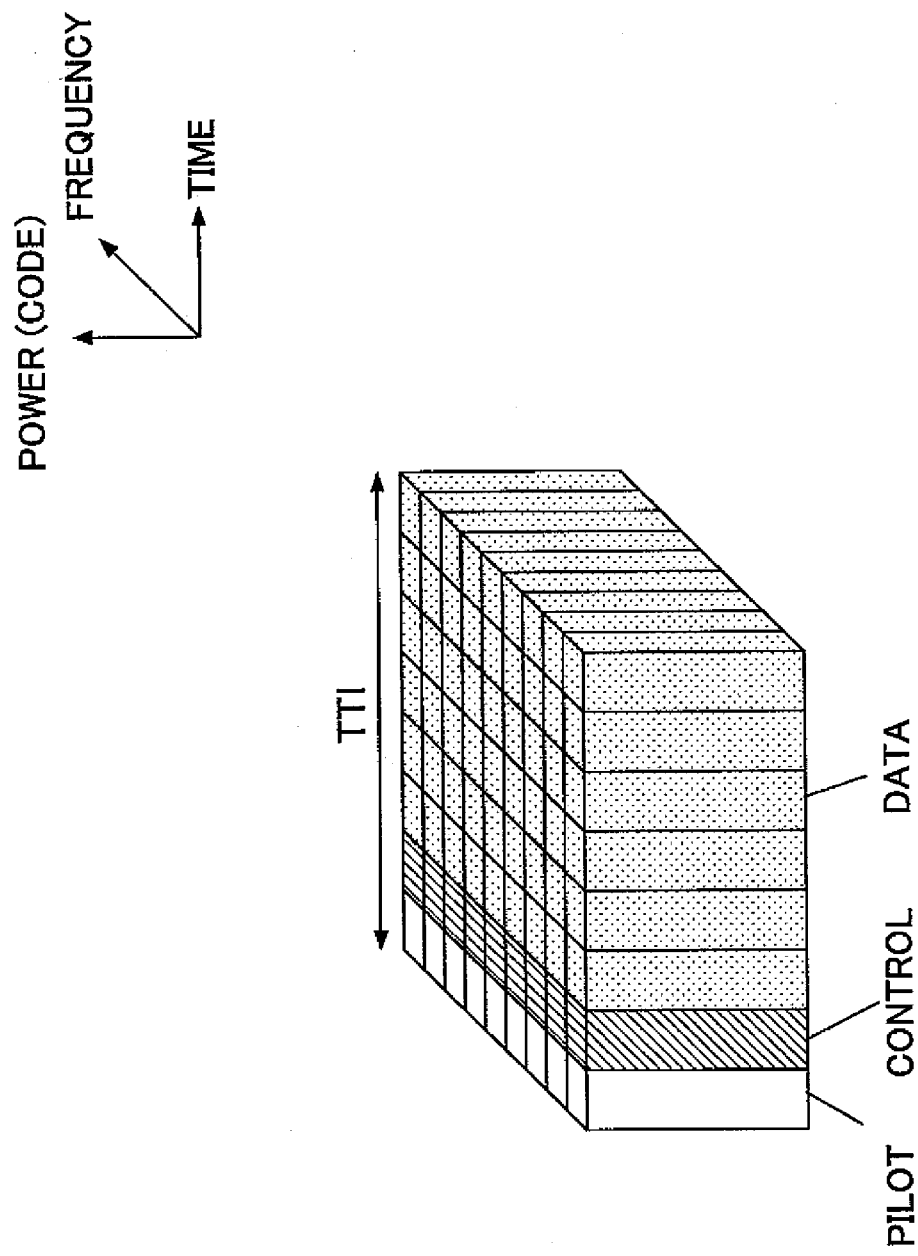

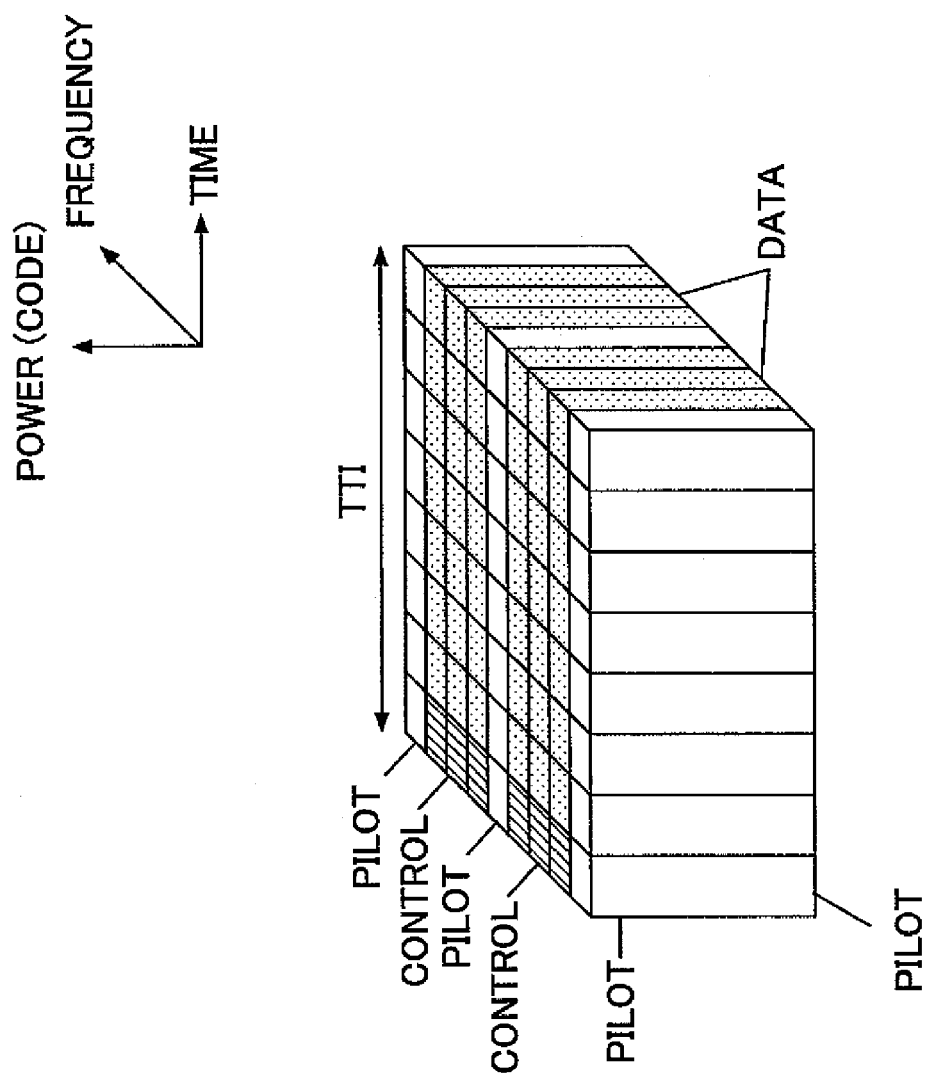

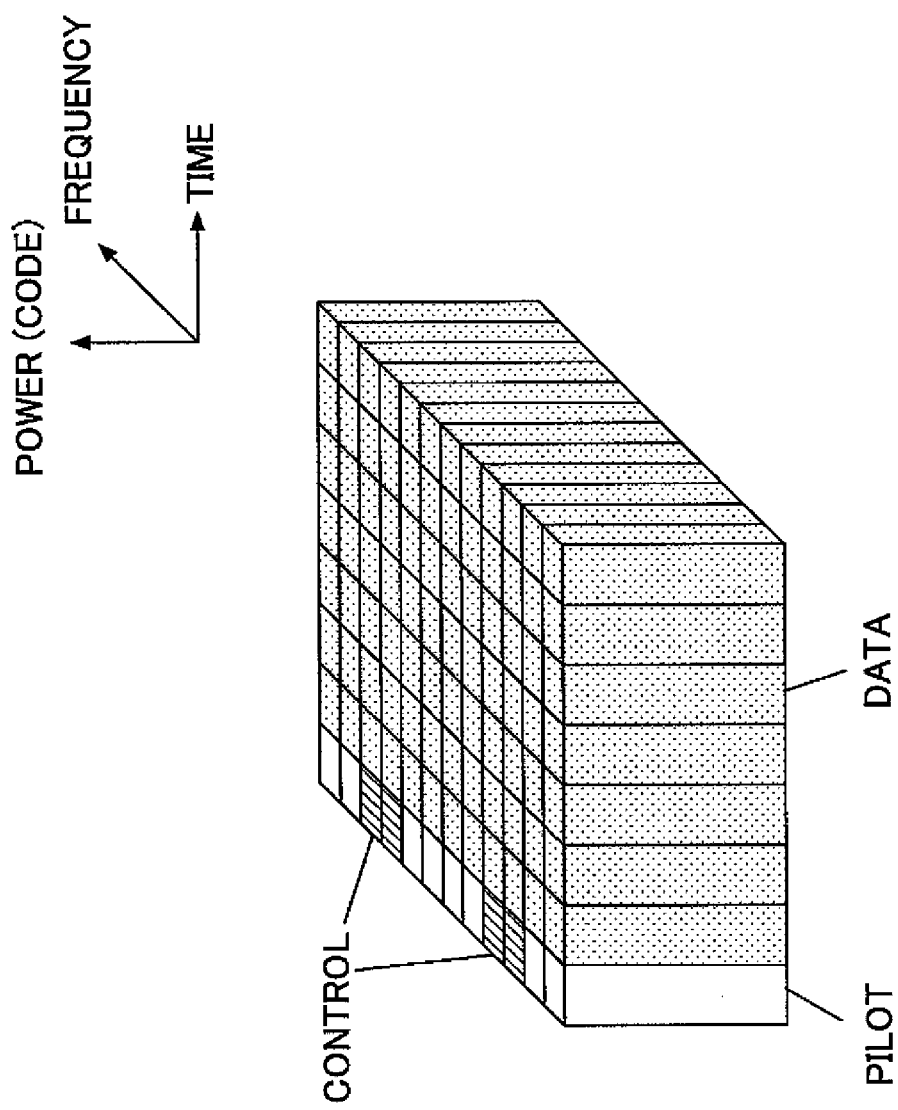

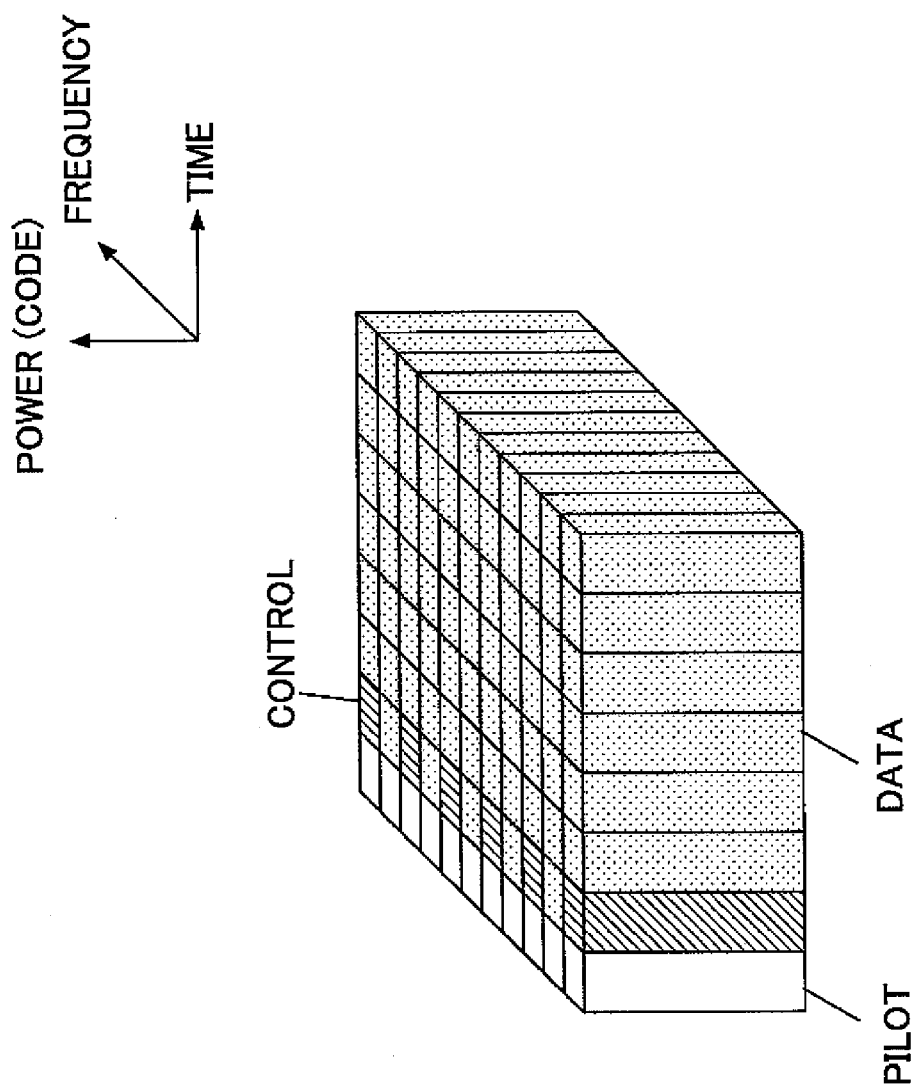

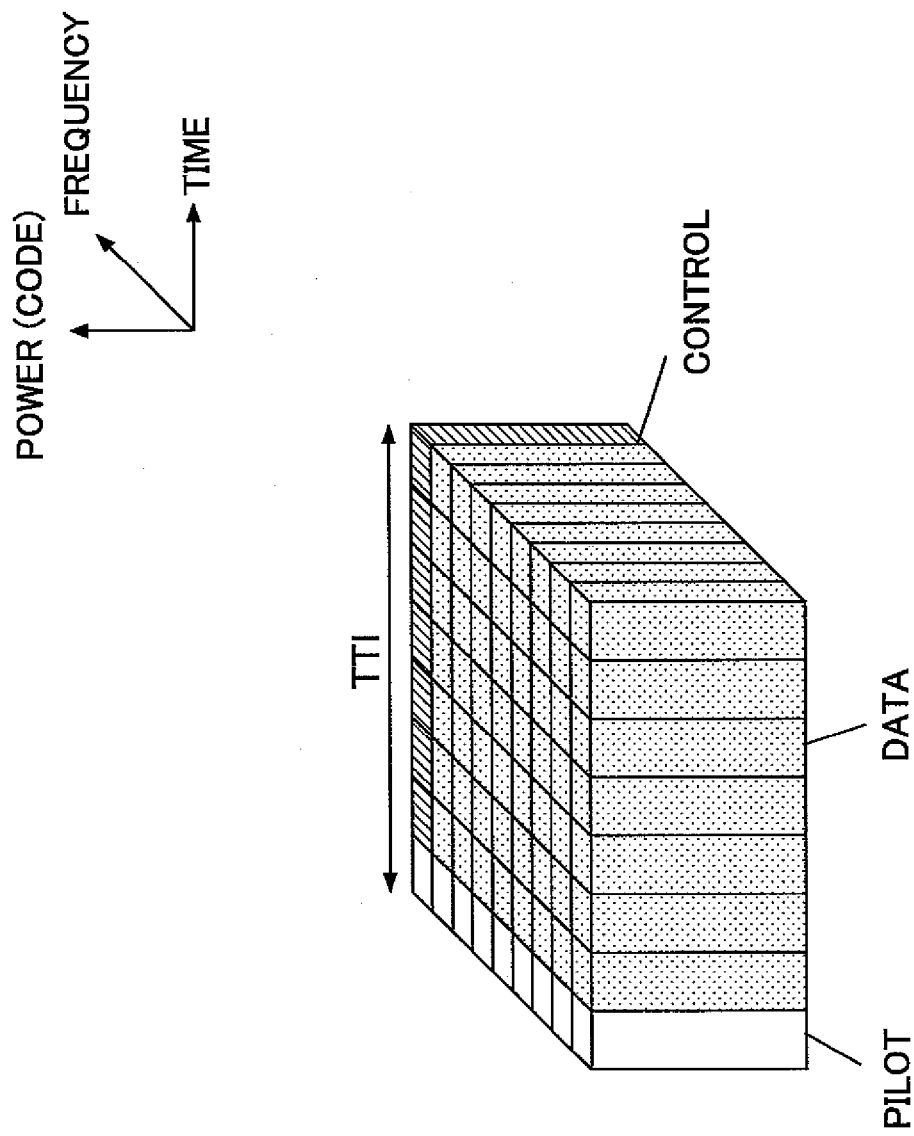

FIG.15B
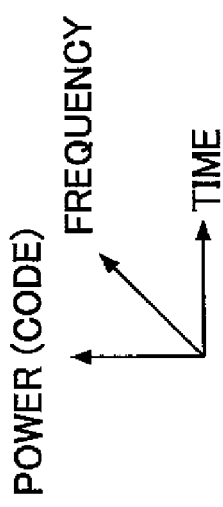
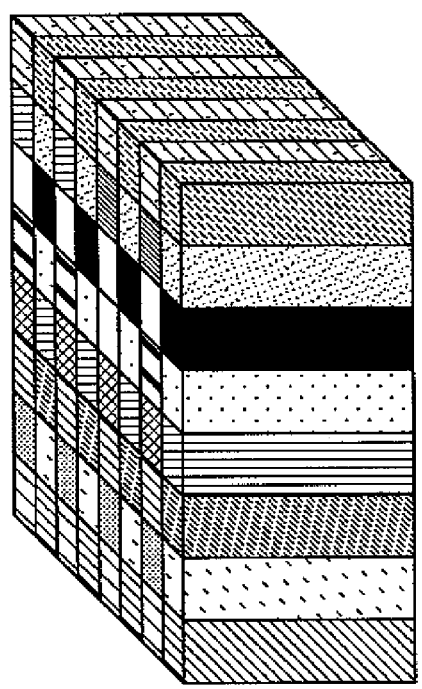
INTERLEAVED

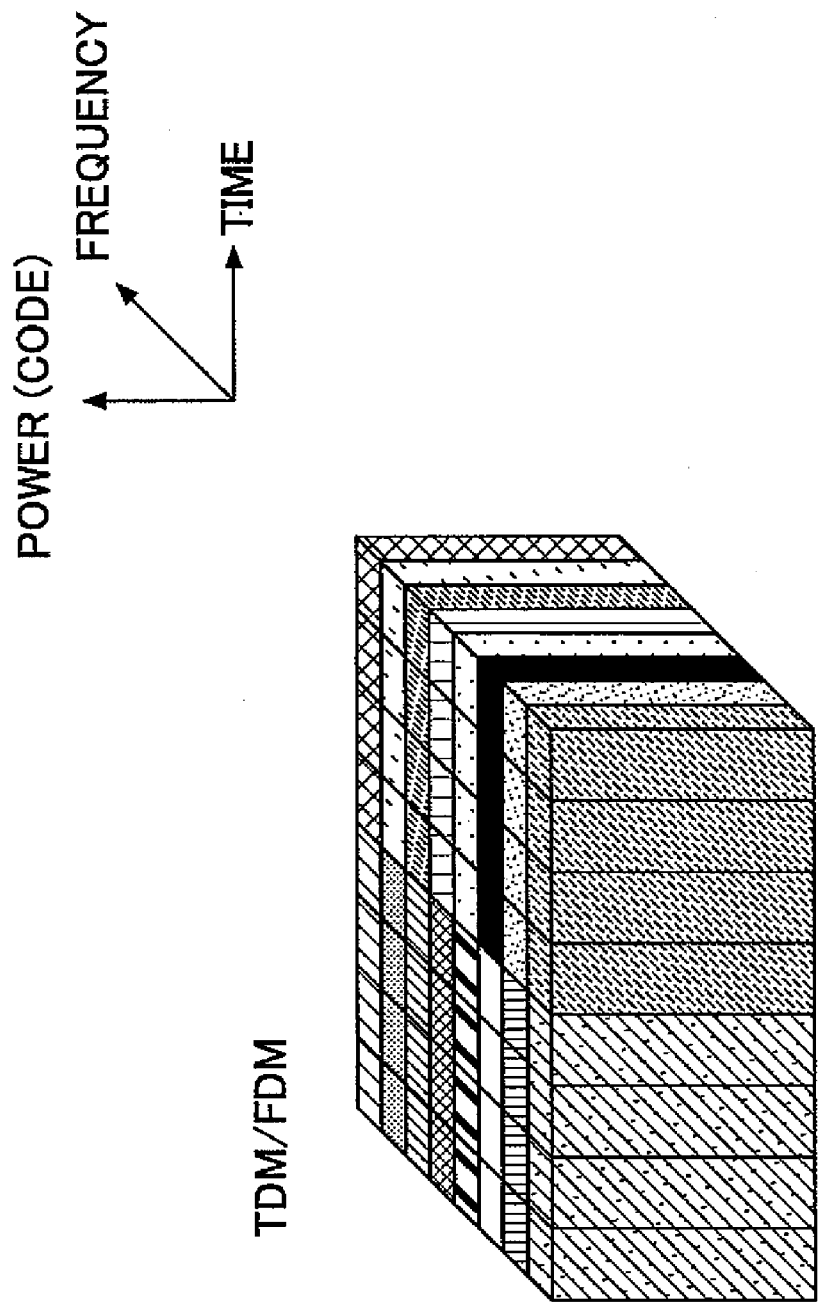

DOWNLINK CHANNEL TRANSMISSION DEVICE AND METHOD THEREOF

TECHNICAL FIELD

The present invention relates to the technical field of radio communications, and particularly, to a transmission device and a transmission method used in a downlink channel.

BACKGROUND OF THE INVENTION

In a third-generation communication system, typified by IMT-2000 (International Mobile Telecommunications-2000), it is particularly required that a downlink channel be of a large capacity, for example, a data transmission rate over 2 Mbps has been achieved with 5 MHz frequency bandwidth. However, a higher data transmission rate, a larger capacity, and lower cost are required in future communication systems. Further, it is also required that mobile terminals be of low power consumption. For example, a patent reference "Japanese Laid Open Patent Application No. 2003-259454" discloses a technique for upgrading the quality of signal transmission by improving the channel structure of a communication system.

DISCLOSURE OF THE INVENTION

Problems to be Solved by the Invention

An object of the present invention is to provide a transmission device and a transmission method able to improve signal quality in a downlink channel.

Methods to Solve the Problems

The present invention provides a transmission device for transmitting a control channel, a pilot channel, and a data channel. The transmission device of the present invention includes a unit that transmits the data channel by using one of a multi-beam and a variable directional beam, said multi-beam including a plurality of fixed directional beams having respective fixed directions different from each other, said variable directional beam being of a direction changing along with the position of a mobile terminal; and a unit that transmits a known signal as the pilot channel by using one of the multi-beam and the variable directional beam.

ADVANTAGES OF THE INVENTION

According to the present invention, it is possible to improve signal quality in a downlink channel.

BRIEF DESCRIPTION OF THE DRAWINGS

These and other objects, features, and advantages of the present invention will become more apparent with reference to the following drawings accompanying the detailed description of the present invention, in which:

FIG. 8 is a table illustrating downlink transmission schemes in the embodiment of the present invention;

FIG. 10A and FIG. 10B are diagrams exemplifying multiplexing schemes (part one) of the pilot channel, the control channel, and the data channel;

FIG. 11A and FIG. 11B are diagrams exemplifying multiplexing schemes (part two) of the pilot channel, the control channel, and the data channel;

FIG. 12A and FIG. 12B are diagrams exemplifying multiplexing schemes (part three) of the pilot channel, the control channel, and the data channel;

FIG. 15A and FIG. 15B are diagrams exemplifying multiplexing schemes (part two) of the data channel;

FIG. 16A through FIG. 16C are diagrams exemplifying multiplexing schemes (part three) of the data channel;

PREFERRED EMBODIMENTS FOR CARRYING OUT THE INVENTION

Figure 1:
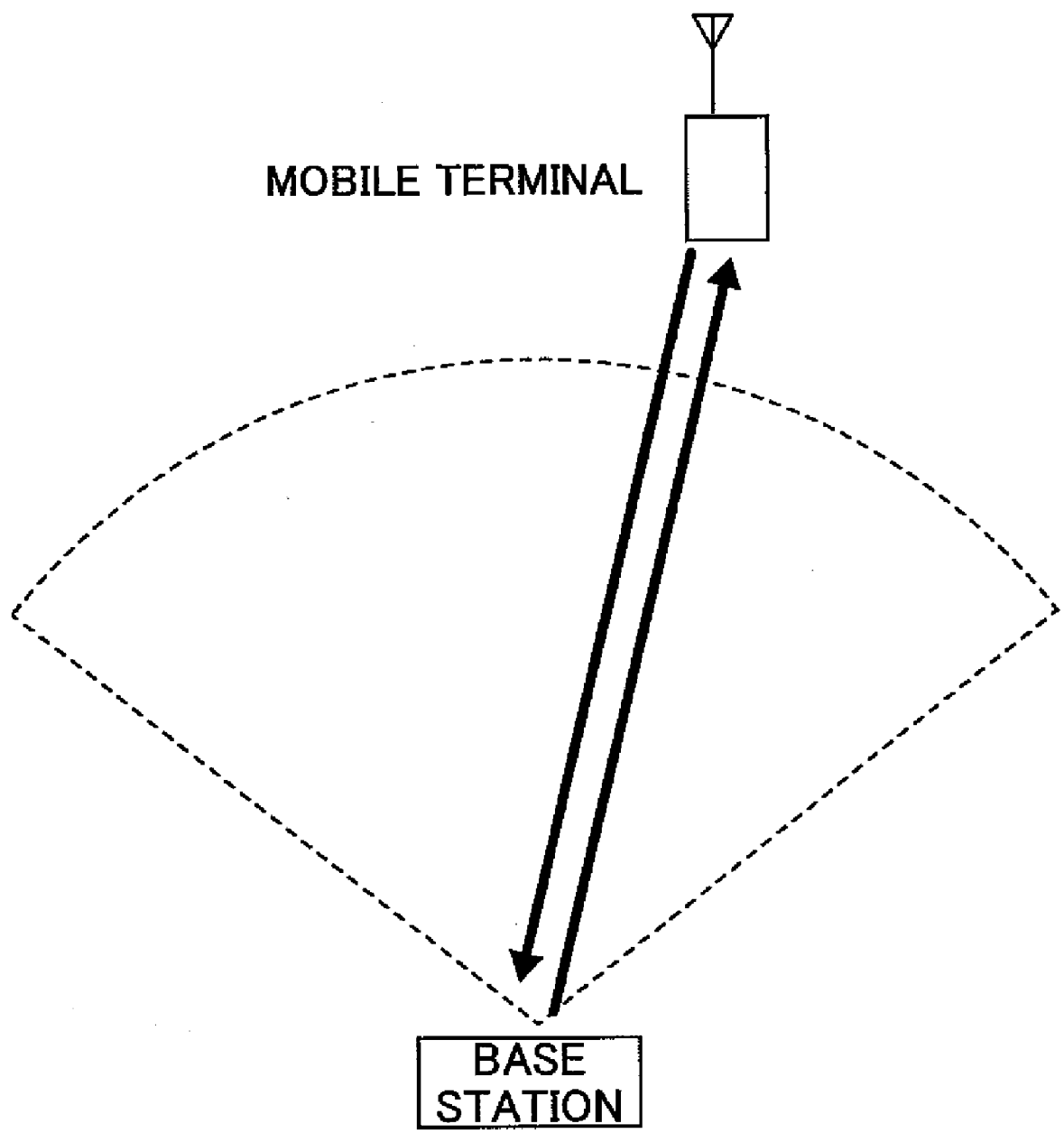
FIG. 1 is a schematic diagram illustrating (an antenna gain pattern) of a sector beam, represented by dashed lines, with regard to the whole area of a sector subtending 120 degrees.

Below, embodiments of the present invention are explained with reference to the accompanying drawings.

According to an embodiment of the present invention, a known signal is transmitted as a pilot channel by using one of a multi-beam and a variable directional beam, the multi-beam including plural fixed directional beams having respective fixed directions different from each other, the variable directional beam being of a direction changing along with the position of a mobile terminal; and a data channel is transmitted by using one of the multi-beam and the variable directional beam.

Since plural types of beams, like the multi-beam and the variable directional beam, are prepared, different beams can be appropriately used for different channels; hence, it is possible to improve signal quality including transmission efficiency.

According to an embodiment of the present invention, the known signal is transmitted, as a dedicated pilot channel, to each mobile terminal by using the variable directional beam. Since the variable directional beam changes its direction along with positions of the mobile terminals, it is possible to transmit high quality signals to the mobile terminals.

According to an embodiment of the present invention, the control channel is transmitted by using one of the multi-beam and the variable directional beam.

According to an embodiment of the present invention, a weighting factor for use of the variable directional beam is adaptively calculated according to the positions of the mobile terminals. Therefore, it is possible to transmit signals with a beam optimized to point to the positions of the mobile terminals.

According to an embodiment of the present invention, the variable directional beam is generated by switching one or more fixed directional beams. Therefore, since the weighting factors of the fixed directional beams in the multi-beam have fixed values, it is possible to simply direct the beam to the position of the mobile terminal without newly calculating the weighting factors.

According to an embodiment of the present invention, the pilot channel and the data channel are multiplexed by one of Time Division Multiplexing and Frequency Division Multiplexing.

According to an embodiment of the present invention, the control channel and the data channel are multiplexed by one of Time Division Multiplexing and Code Division Multiplexing.

According to an embodiment of the present invention, the control channel, the pilot channel, and the data channel are multiplexed by Frequency Division Multiplexing.

According to an embodiment of the present invention, traffic data included in the data channel are multiplexed by one or more of Time Division Multiplexing, Frequency Division Multiplexing, and Code Division Multiplexing. Therefore, the traffic data are interleaved with respect to one or more of Time, Frequency, and Code. Thus, a diversity effect with respect to one or more of Time, Frequency, and Code is obtainable, and it is possible to further improve the transmission quality of signals.

First Embodiment

Beam

In the first embodiment of the present invention, channels in the downlink are transmitted from a base station to a mobile terminal by using one or more of four types of beams. The four types of beams include (1) a sector beam, (2) a multi-beam, (3) a switched beam, and (4) an adaptive directional beam.

(1) A sector beam is a directional beam for realizing an antenna gain pattern extending over cells in charge of the base station or a whole sector.

FIG. 1 is a schematic diagram illustrating (an antenna gain pattern) of a sector beam, represented by dashed lines, with regard to the whole area of a sector subtending 120 degrees.

(2) A multi-beam includes plural fixed directional beams having respective fixed directions different from each other. The number of the fixed directional beams is determined to cover one sector.

Figure 2:
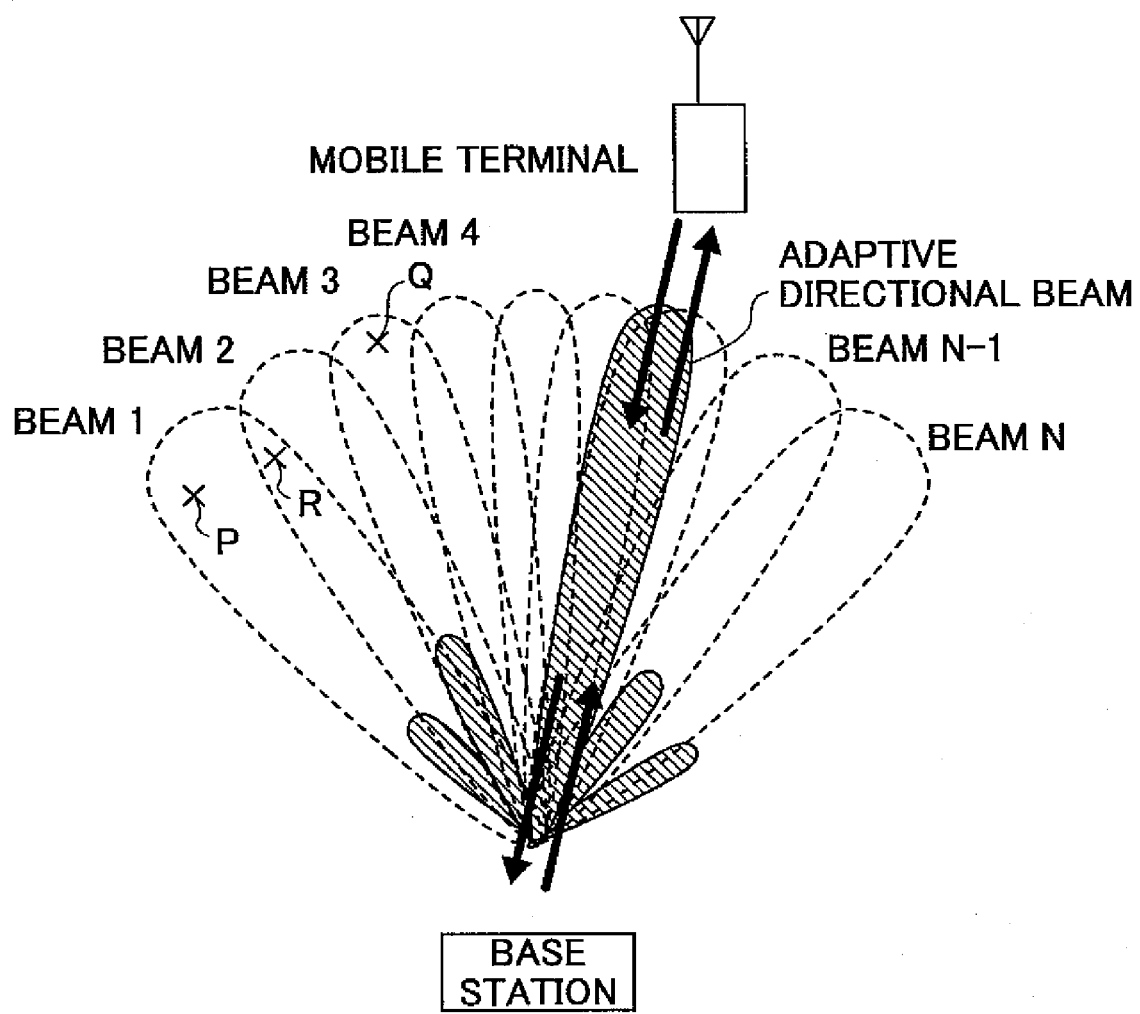
FIG. 2 is a schematic diagram illustrating N fixed directional beams, represented by dashed lines, covering one sector.

FIG. 2 is a schematic diagram of illustrating N fixed directional beams, represented by dashed lines, covering one sector.

(3) A switched beam is a variable directional beam generated by switching one or more of the fixed directional beams included in a multi-beam according to the position of the mobile terminal (may also be referred to as a "switched directional beam").

For example, when the mobile terminal moves from a point P to a point Q as shown in FIG. 2, the switched beam is equivalent to a beam 1 at first, and is then switched to a beam 3. For a mobile terminal (for example, at a point R) at a distance nearly the same from the beam 1 and a beam 2, a directional beam obtained by combining the beam 1 and the beam 2 can be used as the switched beam for the mobile terminal.

(4) An adaptive directional beam is obtained by adaptively calculating, according to the position of the mobile terminal, weighting factors assigned to the antenna. Although the directions of both the switched beam and the adaptive directional beam change along with the position of the mobile terminal, the adaptive directional beam is different from the switched beam in that beam weighting factors are not assigned in advance but are calculated sequentially.

In FIG. 2, the adaptive directional beam is represented by solid lines.

Device Configuration

Figure 3:
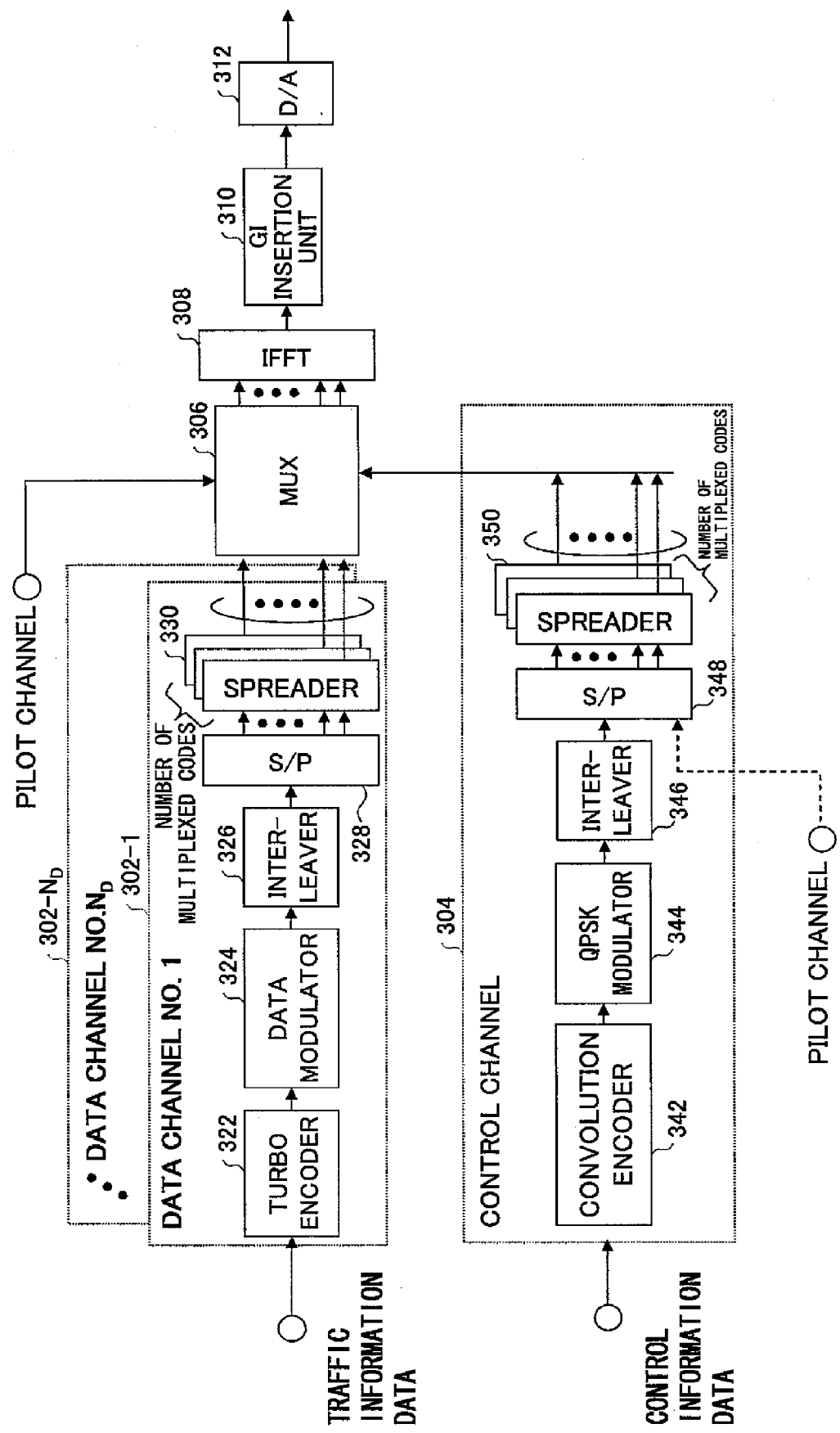
FIG. 3 is a schematic block diagram illustrating a transmission device (part 1) for transmitting a sector beam.

FIG. 3 is a schematic block diagram illustrating a transmission device (part 1) for transmitting a sector beam.

Typically, the transmission device is provided in a base station, but the same transmission device may also be provided in a mobile terminal.

The base station is used in an OFCDM (Orthogonal Frequency and Code Division Multiplexing) communication system. The base station includes $N_D$ data channel processing units 302-1 through 301-$N_D$, a control channel processing unit 304, a multiplexer 306, an Inverse Fast Fourier Transforming (IFFT) unit 308, a guard interval (GI) insertion unit 310, and a digital-analogue converter (D/A) 312. Here, because the $N_D$ data channel processing units 302-1 through 301-$N_D$ have the same structure and functions, below, the data channel processing unit 302-1 is used as an example for descriptions.

The data channel processing unit 302-1 has a turbo encoder 322, a data modulator 324, an interleaver 326, a serial-parallel (S/P) converter 328, and a spreader 330.

The control channel processing unit 304 includes a convolution encoder 342, a QPSK modulator 344, an interleaver 346, a serial-parallel (S/P) converter 348, and a spreader 350. It should be noted that in embodiments adopting OFCDM not performing code spread, the spreader 330 and the spreader 350 can be omitted.

The $N_D$ data channel processing units 302-1 through 301-$N_D$ perform baseband processing for transmitting traffic data by the OFCDM scheme.

The turbo encoder 322 performs coding for improving error resistance of the traffic data.

The data modulator 324 modulates the traffic data by an appropriate modulation scheme, like QPSK, 16QAM, 64QAM and others. When AMC (Adaptive Modulation and Coding) is performed, the modulation scheme is appropriately changed.

The interleaver 326 re-arranges the arrangement order of the traffic data according to a given pattern.

The serial-parallel (S/P) converter 328 converts a serial signal sequence (a stream) into parallel signal sequences. The number of the parallel signal sequences may be determined in response to the number of sub-carriers.

The spreader 330 multiplies each of the parallel signal sequences by a preset spreading code to perform code spreading. In the present embodiment, two dimensional spreading is performed, and signals are spread in a time direction and/or in a frequency direction.

The control channel processing unit 304 performs baseband processing for transmitting control data by the OFCDM scheme.

The convolution encoder 342 performs coding for improving error resistance of the control data.

The QPSK modulator 344 modulates the control data by a QPSK modulation scheme. Here, any other modulation schemes may be used, but since the amount of the control data is small, in the present embodiment, the QPSK modulation scheme is adopted, which involves a small number of modulation multi-levels.

The interleaver 346 re-arranges the arrangement order of the control data according to a given pattern.

The serial-parallel (S/P) converter 348 converts a serial signal sequence (a stream) into parallel signal sequences. The number of the parallel signal sequences may be determined in response to the number of sub-carriers.

The spreader 350 multiplies each of the parallel signal sequences by a preset spreading code to perform code spreading.

The multiplexer 306 multiplexes the processed traffic data and the processed control data. The multiplexing can be performed by Time Division Multiplexing, Frequency Division Multiplexing, or Code Division Multiplexing. In the present embodiment, a pilot channel is input to the multiplexer 306, and is multiplexed. In other embodiments, as shown by dashed lines in FIG. 3, the pilot channel is input to the serial-parallel converter 348, and the pilot channel is multiplexed in a frequency axis direction (this is described below).

The Inverse Fast Fourier Transforming unit 308 transforms input signals by Inverse Fast Fourier Transformation to perform OFDM modulation.

The GI insertion unit 310 inserts guard intervals in the modulated signal to generate symbols in the OFDM scheme. As is well-known, the guard intervals are generated by duplicating a portion at a header or an end of the symbols to be transmitted.

The digital-analogue converter (D/A) 312 converts digital signals of the baseband to analog signals.

Figure 4:
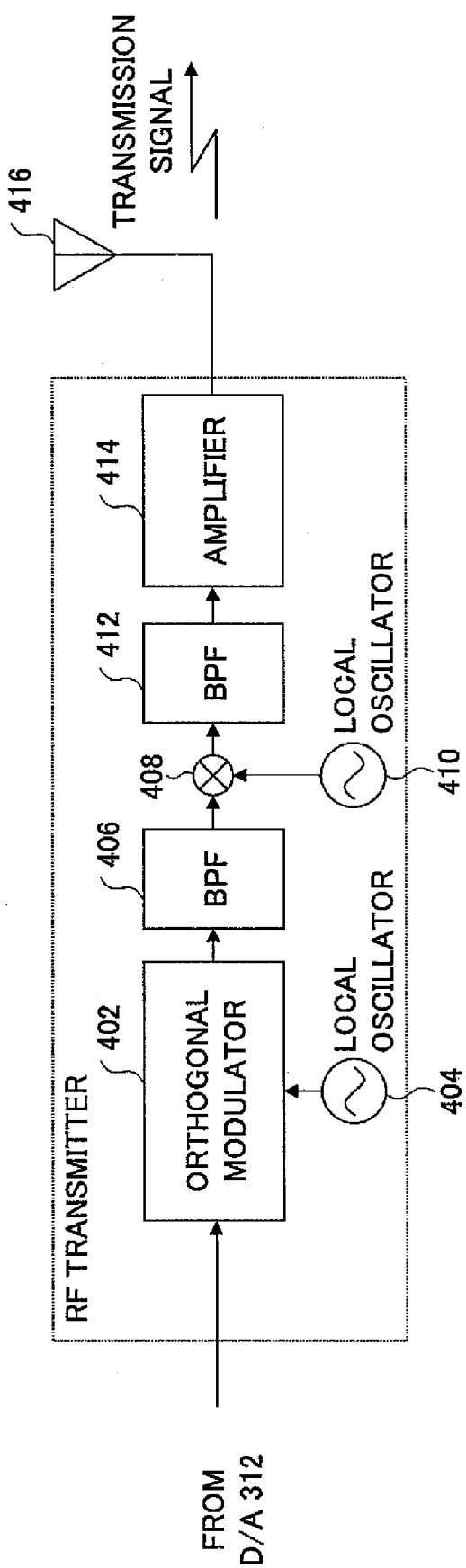
FIG. 4 is a schematic block diagram illustrating a transmission device (part 2) for transmitting a sector beam.

FIG. 4 is a schematic block diagram illustrating a transmission device (part 2) for transmitting a sector beam. Specifically, FIG. 4 illustrates the portion (RF transmitter) of the transmission device in FIG. 3 subsequent to the digital-analogue converter 312.

The RF transmitter includes an orthogonal modulator 402, a local oscillator 404, a band-filter 406, a mixer 408, a local oscillator 410, a band-filter 412, and a power amplifier 414.

The orthogonal modulator 402 generates an in-phase component (I) and an orthogonal component (Q) of an intermediate frequency from input signals to the orthogonal modulator 402.

The band-filter 406 removes excessive frequency components from the intermediate frequency band.

The mixer 408 uses the local oscillator 410 to convert the inteuaediate frequency signals to high frequency signals (this is referred to as "up convert").

The band-filter 412 removes excessive frequency components.

The power amplifier 414 amplifies signals in order for radio transmission from an antenna 416.

The traffic data are coded by the turbo encoder 322, modulated by the data modulator 324, re-arranged by the interleaver 326, converted into parallel signal sequences by the serial-parallel (S/P) converter 328, and are spread by the spreader 330 for each sub-carrier component.

Similarly, the control data are coded, modulated, interleaved, converted into parallel signal sequences, and spread for each sub-carrier component.

The data channel and the control channel after spreading are multiplexed by the multiplexer 306, and modulated by OFDM in the Inverse Fast Fourier Transforming unit 308; guard intervals are inserted into the modulated signal, and OFDM symbols in the baseband are output. The baseband signals are converted into analog signals, modulated, by orthogonal modulation, in the orthogonal modulator 402 of the RF transmitter, and, after band limitation are amplified appropriately and transmitted by radio.

Figure 5:
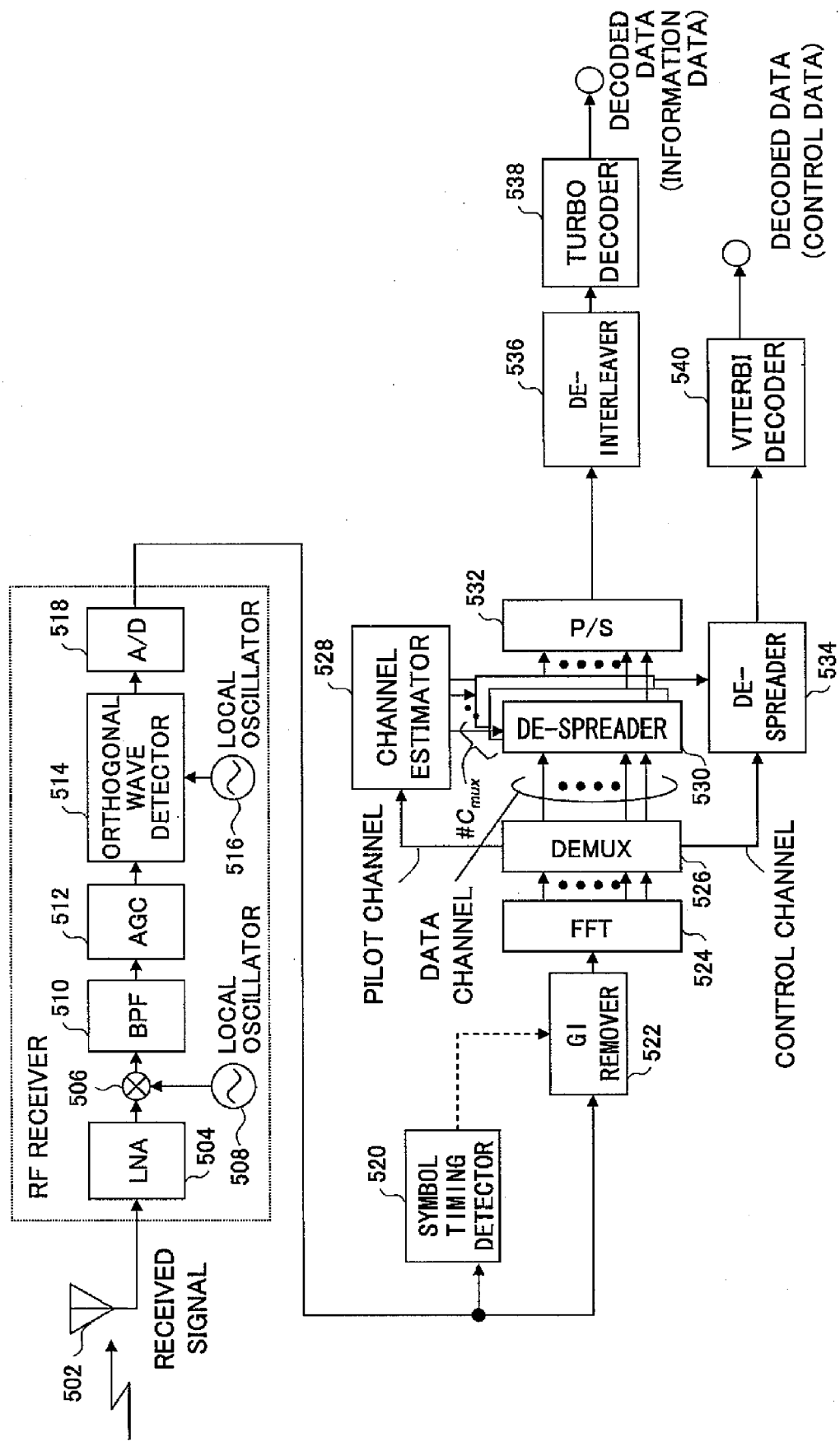
FIG. 5 is a schematic block diagram illustrating a receiving device for receiving a sector beam.

FIG. 5 is a schematic block diagram illustrating a receiving device for receiving a sector beam. Typically, the receiving device is provided in a mobile terminal, but the same receiving device may also be provided in a base station.

For purposes of descriptions, below, it is described that the receiving device receives the sector beam, but the receiving device can be used for receiving other kinds of beams.

The receiving device includes an antenna 502, a low-noise amplifier 504, a mixer 506, a local oscillator 508, a band-pass filter 510, an automatic gain controller 512, an orthogonal wave detector 514, a local oscillator 516, an analogue-digital converter (A/D) 518, a symbol timing detector 520, a guard interval remover 522, a Fast Fourier transformer 524, a de-multiplexer 526, a channel estimator 528, a de-spreader 530, a parallel-serial (P/S) converter 532, a de-spreader 534, a de-interleaver 536, a turbo decoder 538, and a Viterbi decoder 540.

The low-noise amplifier 504 appropriately amplifies signals received by the antenna 502. The amplified signals are converted into an intermediate frequency by the mixer 506 and the local oscillator 508 (this process is referred to as "down convert").

The band-pass filter 510 removes unwanted frequency components.

The automatic gain controller 512 controls the gain of the amplifier so that the signal level is appropriately maintained.

The orthogonal wave detector 514 uses the local oscillator 516 to perform orthogonal demodulation based on an in-phase component (I) and an orthogonal component (Q) of the received signals.

The analogue-digital converter (A/D) 518 converts an analog signal to a digital signal.

The symbol timing detector 520 detects a symbol timing (symbol boundary) based on the digital signal.

The guard interval remover 522 removes a portion corresponding to the guard interval from the received signal.

The Fast Fourier transformer 524 transforms input signals by Fast Fourier Transformation to perform OFDM demodulation.

The de-multiplexer 526 de-multiplexes the pilot channel, the data channel, and the control channel multiplexed in the received signals. The method of de-multiplexing corresponds to multiplexing on the transmission side (namely, processing in the multiplexer 306 as shown in FIG. 3).

The channel estimator 528 estimates channel variation by using the pilot channel and outputs a control signal for amplitude and phase adjustment so as to compensate for channel variation. The control signal is output for each sub-carrier.

The de-spreader 530 de-spreads the compensated data channel with respect to each sub-carrier. Here, assume a number of multiplexed codes is represented by C.

The parallel-serial (P/S) converter 532 converts parallel signal sequences into a serial signal sequence.

The de-interleaver 536 changes an arrangement order of signals according to a given pattern. The given pattern corresponds to a pattern reverse to the pattern of the re-arrangement performed in the interleaver 326 (FIG. 3) on the transmission side.

The turbo decoder 538 and the Viterbi decoder 540 decode the traffic data and the control data, respectively.

The signals received by the antenna 502 are converted into digital signals through amplification, frequency transformation, band limitation, orthogonal demodulation, and other processing. After the guard interval is removed from the received signals, the Fast Fourier transformer 524 performs OFDM demodulation on the signals. The de-multiplexer 526 further de-multiplexes the pilot channel, the data channel, and the control channel multiplexed in the demodulated signals. The pilot channel is input to the channel estimator 528, and a control signal is output from the channel estimator 528 for compensating for channel variation with respect to each sub-carrier.

The data channels are compensated for by using the control signal, de-spread with respect to each sub-carrier, and are converted into a serial signal sequence. The de-interleaver 536 re-arranges the converted signals by using a pattern reverse to the pattern used for re-arrangement by the inter-leaver 326. Then, resulting signals are decoded in the turbo decoder 538.

Similarly, for the control channels, channel variation is compensated for by using the control signal, the control channels are de-spread, and are decoded by the Viterbi decoder 540.

Afterward, the decoded control channels and data channels are used for signal processing.

Figure 6:
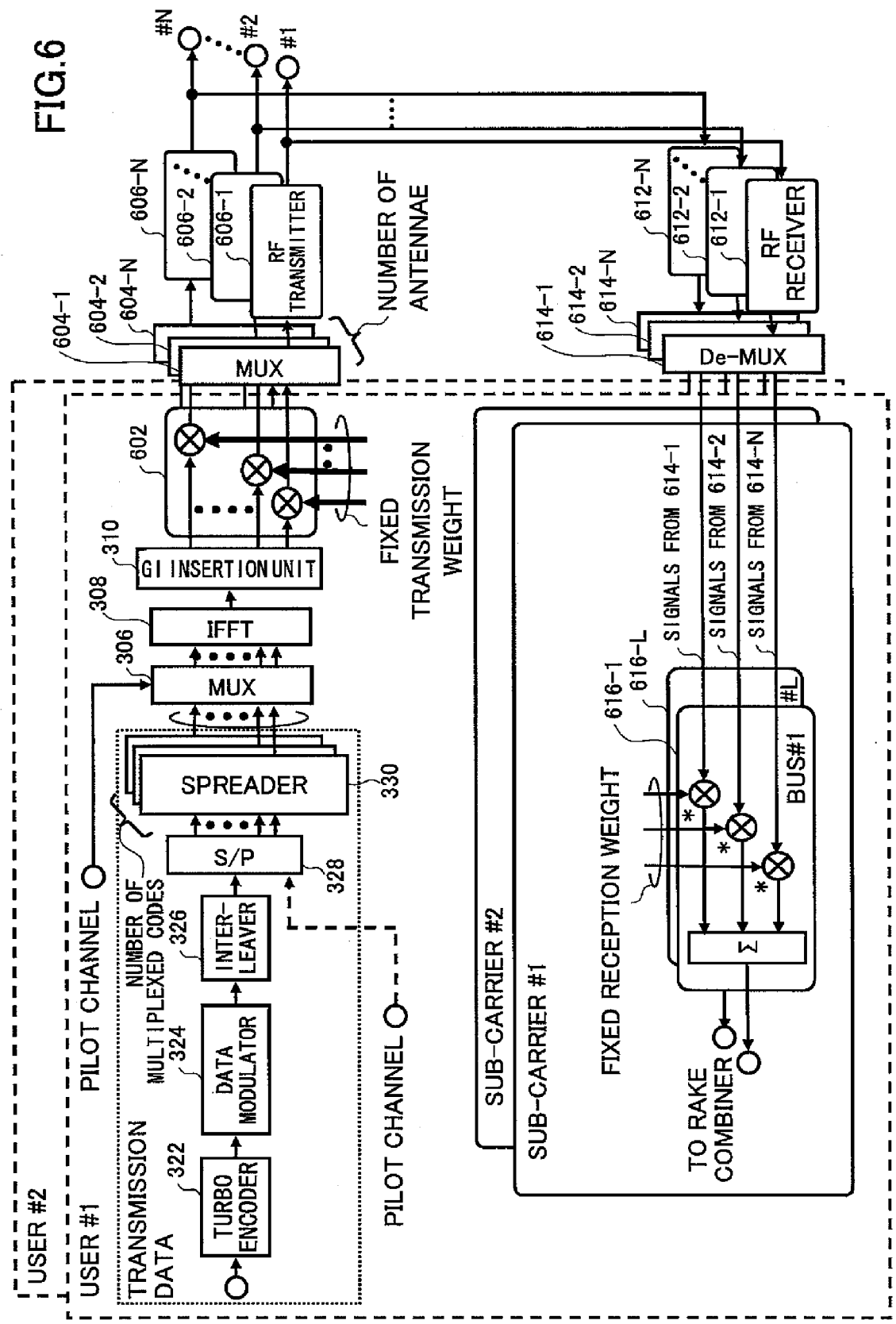
FIG. 6 is a schematic block diagram illustrating a base station which uses a multi-beam for signal transmission and reception.

FIG. 6 is a schematic block diagram illustrating a base station which uses a multi-beam for signal transmission and reception. Typically, such a signal transmission and reception device is provided in a base station, but it may also be provided in a mobile terminal.

In FIG. 6, the same reference numbers are assigned to the same components as described with reference FIG. 3, and overlapping descriptions are omitted. In FIG. 6, components related to the control channel are omitted.

Components shown in FIG. 6 include a transmission weight setting unit 602, N multiplexers 604-1 through 604-N (N is the number of antennae), N RF transmitters 606-1 through 606-N, N RF receivers 612-1 through 612-N, N de-multiplexers 614-1 through 614-N, and L reception weight setting unit 616-1 through 616-L.

The transmission weight setting unit 602 multiplies each of signals transmitted from the N antennae by a transmission weight (a weighting factor). The transmission weight is a fixed weight prepared in advance for realizing the multi-beam.

The N multiplexers 604-1 through 604-N multiplex transmission signals for corresponding antennas. For example, the multiplexer 604-1 collects transmission signals coming from a first antenna from $N_D$ data channel processing units and multiplexes the signals; the multiplexer 604-2 collects transmission signals coming from a second antenna from $N_D$ data channel processing units and multiplexes the signals.

The N RF transmitters 606-1 through 606-N perform processing for radio frequency signal transmission antenna by antenna. Detailed operations of the N RF transmitters 606-1 through 606-N are similar to those described with reference to FIG. 4, namely, frequency conversion, band limitation and power amplification are performed.

The N RF receivers 612-1 through 612-N perform operations nearly reverse to those of the RF transmitters 606-1 through 606-N. Namely, the signals received by the N antennae are converted into signals suitable for baseband processing.

The N demultiplexers 614-1 through 614-N perform operations nearly reverse to those of the multiplexers 604-1 through 604-N. Namely, the N de-multiplexers 614-1 through 614-N distribute the input signals to the $N_D$ data channel processing units.

The L reception weight setting units 616-1 through 616-L multiply each of the signals transmitted from the N antennae by a reception weight and combine the signals. This processing is performed path by path. In the present embodiment, it is assumed that there are L multi-path channels. The signals combined with respect to each path are supplied to a not-illustrated Rake combiner. This processing is performed sub-carrier by sub-carrier.

Similar to the transmission weight, the reception weight is also a fixed weight prepared in advance for realizing the multi-beam. Further, the transmission weight and the reception weight may be the same or may be different. For example, when the same frequency is used for signal transmission and reception, since it is predicted that the uplink and downlink channel conditions are the same, the same weight can be used for signal transmission and reception. On the other hand, when different frequencies are used in the uplink and the downlink, since the uplink and downlink channel conditions may be different, different weights can be used.

The components shown in FIG. 6 may also be used when a base station uses the switched beam for signal transmission and reception, except that the transmission weight and the reception weight, and the multiplexers and the de-multiplexers are different. As described previously, the switched beam corresponds to one or more fixed directional beams included in the multi-beam. Therefore, the transmission weight for realizing a switched beam with respect to a mobile terminal #1 is equivalent to the transmission weight related to the fixed directional beam corresponding to the mobile terminal #1 (for example, the direction is $\theta_1$). The transmission weight for realizing a switched beam with respect to a mobile terminal #1 is equivalent to the transmission weight related to the fixed directional beam corresponding to the mobile terminal #1 (for example, the direction is $\theta_1$), and the transmission weight is set by the transmission weight setting unit 602 in the first data channel processing unit 302-1. The transmission weight for realizing a switched beam with respect to another mobile terminal #2 is equivalent to the transmission weight related to the fixed directional beam corresponding to the mobile terminal #2 (for example, the direction is $\theta_2$), and the transmission weight is set by the transmission weight setting unit 602 in the second data channel processing unit 302-2. When the switched beam is used, the switched beam is switched for respective mobile terminals. Therefore, the N multiplexers 604-1 through 604-N output signals only relevant to a first mobile terminal at one time, and output signals only relevant to a second mobile terminal at another time. The same processing is performed on other mobile terminals. Due to this, a switched beam relevant to the first mobile terminal is transmitted at one time, and a switched beam relevant to the second mobile terminal is transmitted at another time. The same processing is performed subsequently. Thus, the switched beams are switched in a time division manner.

In case of signal reception, operations nearly reverse to the above transmission operations are performed. In other words, the de-multiplexers output signals input thereto to a portion for performing processing relevant to the first mobile terminal (typically, the data channel processing unit 302-1) at one time, and output to a portion for performing processing relevant to the second mobile terminal (typically, the data channel processing unit 302-2) at another time. The same processing is performed subsequently. In the data channel processing units, the signals received by the antennae are multiplied with a reception weight. The reception weight is for realizing the switched beam corresponding to the mobile terminal.

Figure 7:
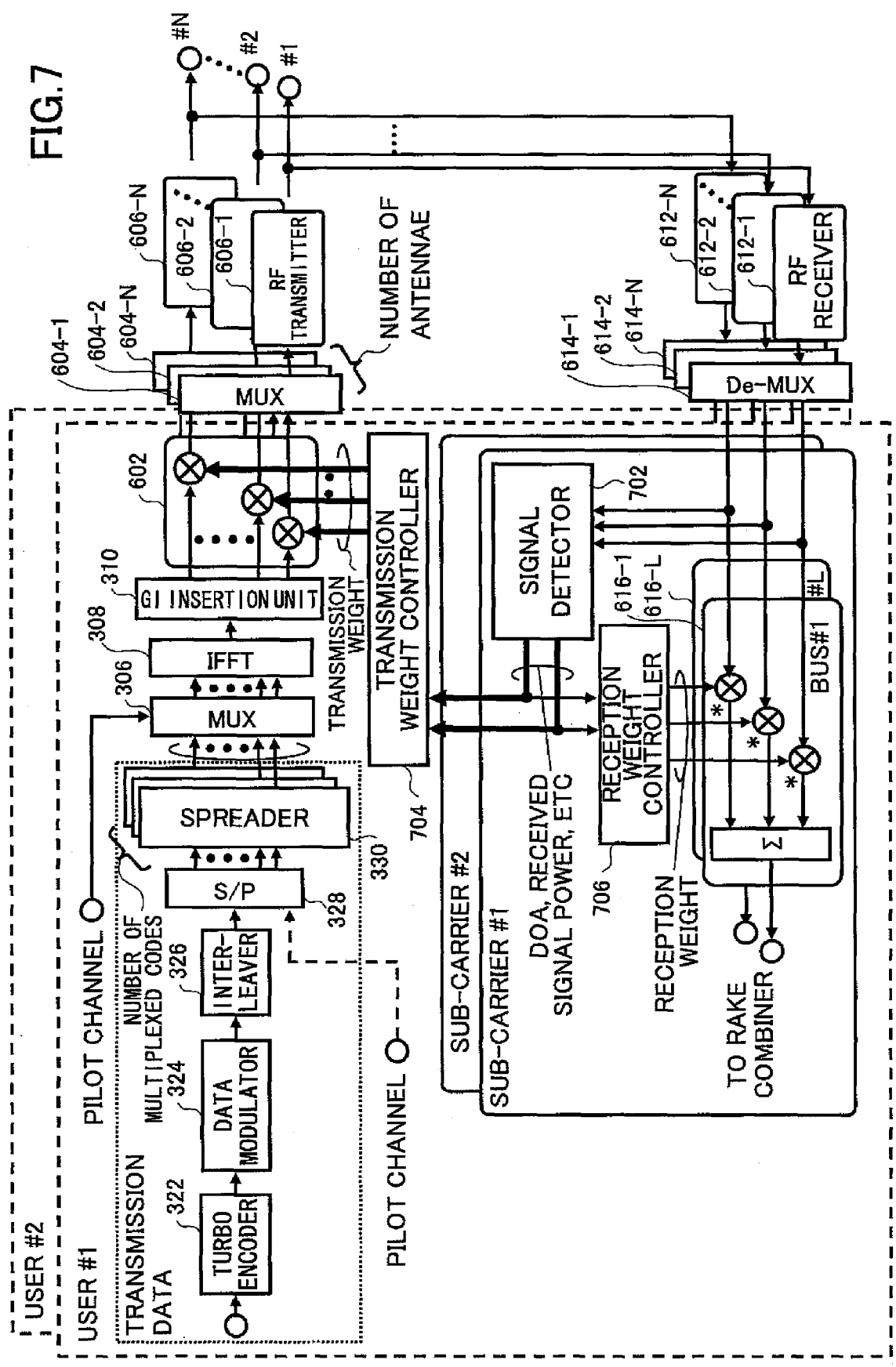
FIG. 7 is a schematic block diagram illustrating a base station which uses an adaptive directional beam for signal transmission and reception.

FIG. 7 is a schematic block diagram illustrating a base station which uses an adaptive directional beam for signal transmission and reception. Similar to the signal transmission and reception device in FIG. 6, typically, such a signal transmission and reception device is provided in a base station, but it may also be provided in a mobile terminal.

In FIG. 7, the same reference numbers are assigned to the same components as described with reference FIG. 3 and FIG. 6, and overlapping descriptions are omitted.

As described previously, the direction of the adaptive directional beam changes along with the position of a mobile terminal. This direction change is not caused by discretely switching plural fixed directional beams, but is a continuous one.

Components shown in FIG. 7 include a signal detector 702, a transmission weight controller 704, and a reception weight controller 706.

The signal detector 702 detects reception power or incoming directions of signals received by each antenna, and outputs the detection results to the transmission weight controller 704 and the reception weight controller 706.

The transmission weight controller 704 adjusts a transmission weight based on the detection results so that a signal quality is further improved. The algorithm of this adjustment may be any appropriate optimum algorithm relevant to an adaptive array antenna (AAA). For example, the transmission weight may be updated successively so that a certain evaluation function of the received signal quality reaches a minimum.

Similarly, the reception weight controller 706 adjusts a reception weight based on the detection results so that the signal quality is further improved.

Transmission Method

With the devices described in FIG. 3 through FIG. 7, it is possible to use various kinds of beams for signal transmission and reception.

In the present embodiment, all of or part of (1) a common control channel, (2) an associated control channel, (3) a shared packet data channel, (4) a dedicated packet data channel, (5) a first common pilot channel, (6) a second common pilot channel, and (7) a dedicated pilot channel are transmitted in downlink.

(1) The common control channel includes a broadcasting channel (BCH), a paging channel (PCH), and a downlink access channel (FACH). The common control channel includes control information relevant to processing on a relative high-rank layer, such as link setting, call control, and others.

(2) The associated control channel includes control information relevant to processing on a relative low-rank layer, and includes information necessary for demodulating the shared packet data channel. For example, this information may include packet numbers, demodulation methods, coding methods, transmission power control bits, ARQ (automatic repeat request) control bits, and so on.

(3) The shared packet data channel corresponds to high-speed radio resources shared by plural users. The radio resources may be distinguished by frequencies, codes, transmission power, and others. Sharing of the radio resources may be achieved by Time Division Multiplexing (TDM), Frequency Division Multiplexing (FDM), and/or Code Division Multiplexing (CDM). Details of multiplexing are described below with reference to FIG. 14A through FIG. 14C. In order to achieve high quality data transmission, adaptive modulation coding (AMC), automatic repeat request (ARQ), or others may be adopted.

(4) The dedicated packet data channel corresponds to radio resources exclusively assigned to specified users. The radio resources may be distinguished by frequencies, codes, transmission power, and so on. In order to achieve high quality data transmission, adaptive modulation coding (AMC), automatic repeat request (ARQ), or others may be adopted.

(5) The first common pilot channel includes known signals on the signal transmission side and the signal reception side, and is transmitted with the sector beam. The known signals are also referred to as pilot signals, reference signals, or training signals. The first common pilot channel is used for channel estimation of the sector beams.

(6) The second common pilot channel includes known signals on the signal transmission side and the signal reception side, and is transmitted with the multi-beam. In other words, the second common pilot channel is transmitted by transmitting the known signals with plural fixed directional beams. The second common pilot channel is used for channel estimation of a certain fixed directional beam.

(7) The dedicated pilot channel includes known signals on the signal transmission side and the signal reception side, and is transmitted with the adaptive directional beam. The dedicated pilot channel is used for channel estimation of the adaptive directional beam.

To summarize, the signals (1) through (4) are unknown to at least one of the signal transmission side and the signal reception side, but contents of the pilot channels (5) through (7) are known to the signal transmission side and the signal reception side before communications start.

FIG. 8 is a table illustrating downlink transmission schemes in the embodiment of the present invention.

The table in FIG. 8 shows four transmission schemes, and specifies which kinds of beams are used for transmitting the above seven kinds of channels.

In the transmission scheme 1, the common control channel, the first common pilot channel, and the associated control channel are transmitted with the sector beam (refer to FIG. 1). The shared packet data channel, the dedicated packet data channel, and the second common pilot channel are transmitted with the switched beam (refer to FIG. 2). The first common pilot channel is used for channel estimation for the common control channel and the associated control channel. The second common pilot channel is used for channel estimation of the shared packet data channel, the dedicated packet data channel. The dedicated pilot channel is not transmitted. Therefore, according to the transmission scheme 1, it is not necessary to adaptively calculate the transmission weight, and this is useful for simple base stations.

In the transmission scheme 2, the common control channel, the first common pilot channel, and the associated control channel are transmitted with the sector beam. The shared packet data channel is transmitted with the multi-beam, the switched beam, or the adaptive directional beam. The dedicated packet data channel and the dedicated pilot channel are transmitted with the adaptive directional beam. The second common pilot channel is transmitted with the multi-beam, or the switched beam. The first common pilot channel is used for channel estimation for the common control channel and the associated control channel. The second common pilot channel is used for channel estimation of the shared packet data channel transmitted with the multi-beam or the switched beam. The dedicated pilot channel is used for channel estimation of the dedicated packet data channel and the shared packet data channel transmitted with the adaptive directional beam. According to the transmission scheme 2, since the dedicated packet data channel is transmitted with the adaptive directional beam, it is possible to further improve quality of service for the specified users.

In the transmission scheme 3, the first common pilot channel and the dedicated pilot channel are not transmitted, and all other channels are transmitted with the multi-beam or the switched beam. The second common pilot channel is used for channel estimation of all of the common control channel, the associated control channel, the shared packet data channel, and the dedicated packet data channel, since the propagation channel of any of these channels is related to a fixed directional beam of the multi-beam. According to the transmission scheme 3, it is not necessary to adaptively calculate the transmission weight, and further, it is possible to reduce one pilot channel. Thus, resources and/or overhead for the pilot channel can be reduced. This scheme has advantages in view of information transmission efficiency.

In the transmission scheme 4, the common control channel and the associated control channel are transmitted with the sector beam or the multi-beam. The shared packet data channel, the dedicated packet data channel and the dedicated pilot channel are transmitted with the adaptive directional beam. The first common pilot channel is not transmitted. The second common pilot channel is transmitted with the multi-beam or the switched beam. The second common pilot channel is used for channel estimation of the shared packet data channel and the associated control channel. The dedicated pilot channel is used for channel estimation of the dedicated packet data channel and the shared packet data channel. According to the transmission scheme 4, this scheme is useful since it is not necessary to transmit the first common pilot channel. Since the shared packet data channel and the dedicated packet data channel are transmitted with the adaptive directional beam, it is possible to transmit the data channels with high quality. Further, if the propagation channel of the adaptive directional beam is made approximate to the propagation channel of any fixed directional beam, instead of the dedicated pilot channel, the second common pilot channel transmitted with the fixed directional beam may be used. In this case, similar to the transmission scheme 3, it is possible to reduce one pilot channel.

Second Embodiment

Next, descriptions are made of multiplexing of (the first common, the second common, or the dedicated) pilot channel, (the common or the associated) control channel, and (the common or the dedicated) data channel.

The multiplexing is made by using one or more of Time Division Multiplexing (TDM), Frequency Division Multiplexing (FDM), and Code Division Multiplexing (CDM). TDM and CDM are performed in the multiplexer 306 of the transmitter shown in FIG. 3, FIG. 6, and FIG. 7. Accordingly, de-multiplexing of the multiplexed signals in the receiver is performed in the de-multiplexer 526 shown in FIG. 5. FDM performed in the serial-parallel converters 328, 348 of the transmitter shown in FIG. 3, FIG. 6, and FIG. 7. Accordingly, demultiplexing of the multiplexed signals is performed in the receiver in the parallel-serial converter 532 as shown in FIG. 5. In TDM, the multiplexed plural signals are switched one by one, but in FDM and CDM, the multiplexed plural signals can be summed.

Below, various examples of multiplexing are described; it should be noted that these examples are just for illustration, but not limit the scope of the present invention.

FIG. 9A through FIG. 9E are diagrams illustrating multiplexing schemes of the pilot channel and the data channel.

Figure 9A:
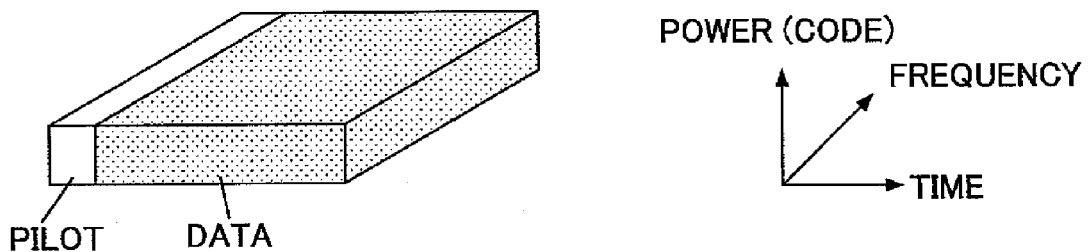
FIG. 9A through FIG. 9E are diagrams illustrating multiplexing schemes of the pilot channel and the data channel.

Specifically, FIG. 9A illustrates time multiplexing of the pilot channel and the data channel.

When influence of frequency selectivity fading is strong, it is advantageous to insert the pilot channel along a frequency direction, as shown in FIG. 9A, since it is possible to prevent degradation of the transmission quality by performing interleaving in the frequency direction.

Figure 9B:
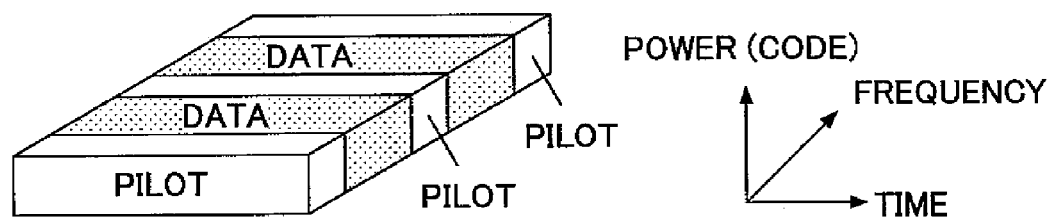

FIG. 9B illustrates frequency multiplexing of the pilot channel and the data channel.

Figure 9C:
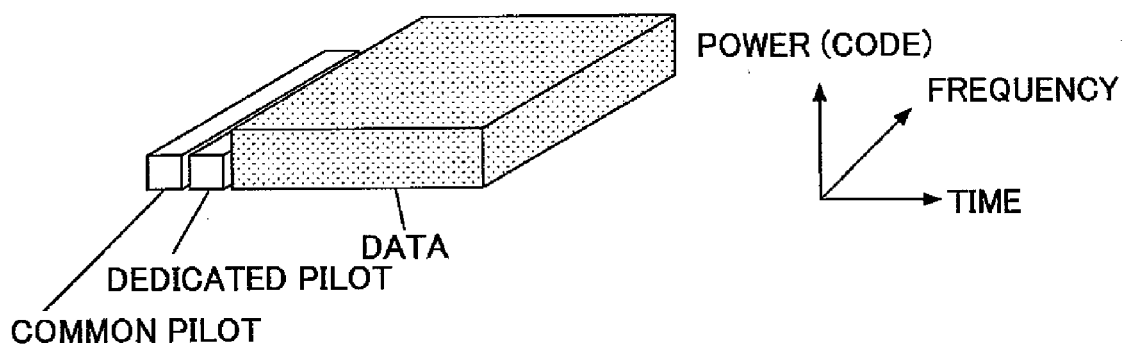
Figure 9D:
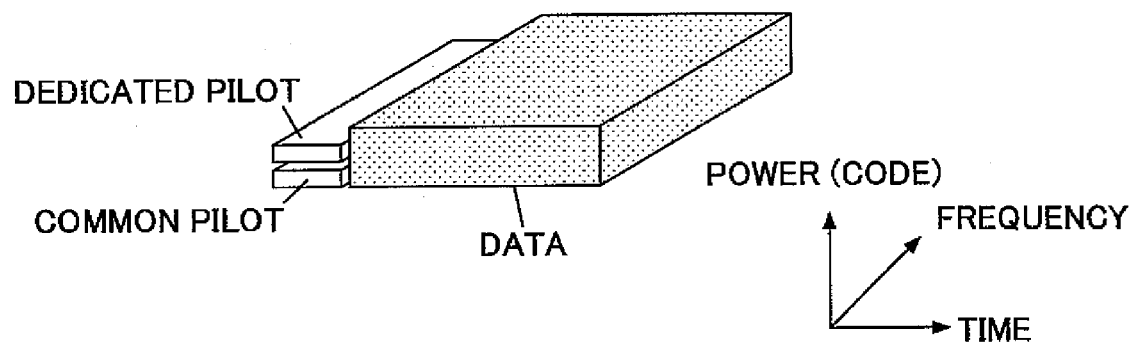

FIG. 9C and FIG. 9D illustrate multiplexing of the first common pilot channel or the second common pilot channel, the dedicated pilot channel, and the data channel.

Specifically, FIG. 9C illustrates time multiplexing of the common and dedicated pilot channels, and the data channel. Multiplexing in this way is especially useful in a communication environment like a hot spot (isolated cell), which uses multi-carriers in downlink, namely, code spreading is not performed (the code spreading factor SF is 1). In the isolated cell, interference from neighboring cells can be neglected, and interference within the current cell is very small because of the orthogonality between sub-carriers. Therefore, in such a communication environment, it is good choice not to perform code spreading. Since if code spreading is performed, (the code spreading factor SF is greater than 1), interference within the current cell is very large. In addition, fading may occur along the time and the frequency directions. Frequency fading changes frequently compared to fading in the time direction. Hence, compared to Frequency Multiplexing, it is the time multiplexing that is able to prevent degradation of the transmission quality.

FIG. 9D illustrates code multiplexing of the common and dedicated pilot channels, and time multiplexing of these channels with the data channel.

In this example, since the data channel is not multiplexed by code multiplexing, as explained with reference to FIG. 9C, in the data channel, it is possible to adopt an operation mode in which the code spreading factor SF is 1. In addition, since fading in the frequency direction changes frequently compared to fading in the time direction, it is preferable that spreading of the common and dedicated pilot channels be carried out in the time direction. For this reason, in this example, durations of the common and dedicated pilot channels are somewhat longer than those shown in FIG. 9C.

Figure 9E:
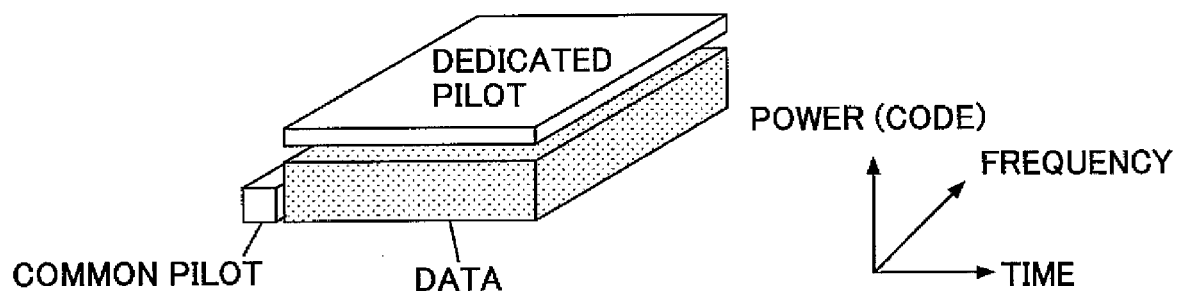

FIG. 9E illustrates code multiplexing of the dedicated pilot channel and the data channel, and time multiplexing of these channels with the common pilot channel.

Since the dedicated pilot channel is assigned for each mobile terminal, it is desirable to set a large number of dedicated pilot channels. In this example, the duration of the dedicated pilot channel is longer than those shown in FIG. 9C and FIG. 9D. Therefore, the code spreading factor SF can be set large to ensure a large number of spreading codes, and to prepare a large number of dedicated pilot channels. Such kind of multiplexing is suitable for a communication environment having plural cells and interference from neighboring cells (interference from other cells) has to be considered.

FIG. 10A and FIG. 10B are diagrams exemplifying multiplexing schemes (part one) of the pilot channel, the control channel, and the data channel.

Specifically, FIG. 10A illustrates time multiplexing of the pilot channel, the control channel, and the data channel.

As described above, considering the influence of frequency selectivity fading, it is preferable to perform such kind of multiplexing.

FIG. 10B illustrates frequency multiplexing of the pilot channel and the control channel, and frequency multiplexing of the pilot channel and the data channel, and time multiplexing of the control channel and the data channel.

FIG. 11A and FIG. 11B are diagrams exemplifying multiplexing schemes (part two) of the pilot channel, the control channel, and the data channel.

Specifically, FIG. 11A illustrates frequency multiplexing of the pilot channel and the control channel, and time multiplexing of these channels with the data channel.

In FIG. 10A, a period equivalent to two symbols is required before the data channel, but in the example shown in FIG. 11A, it is sufficient to provide a period equivalent to one symbol before the data channel, and this is useful.

FIG. 11B illustrates time multiplexing of the pilot channel, the control channel, and the data channel, and frequency multiplexing of the control channel and the data channel.

Figure 12B:
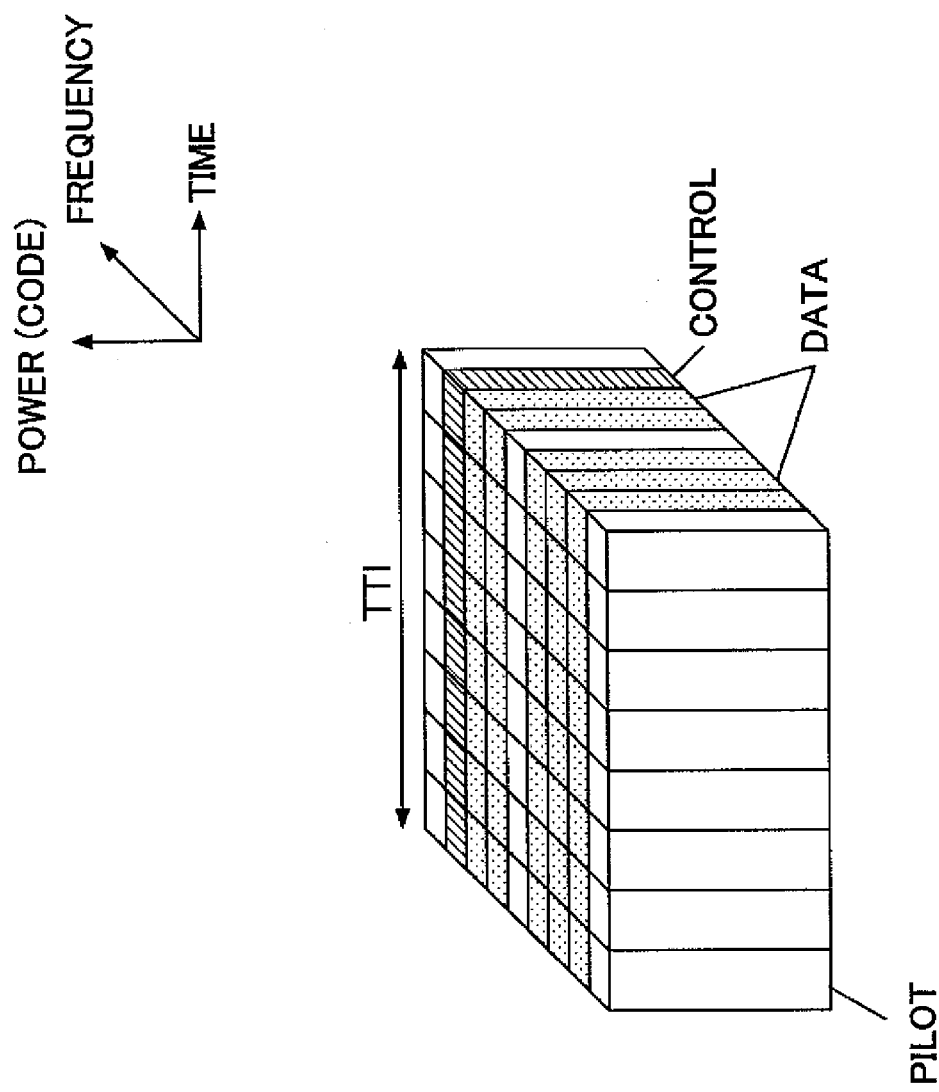

FIG. 12A and FIG. 12B are diagrams exemplifying multiplexing schemes (part three) of the pilot channel, the control channel, and the data channel.

Specifically, FIG. 12A illustrates time multiplexing of the pilot channel, the control channel, and the data channel, and frequency multiplexing of the control channel and the data channel.

FIG. 12B illustrates frequency multiplexing of the pilot channel, the control channel, and the data channel.

Figure 13A:
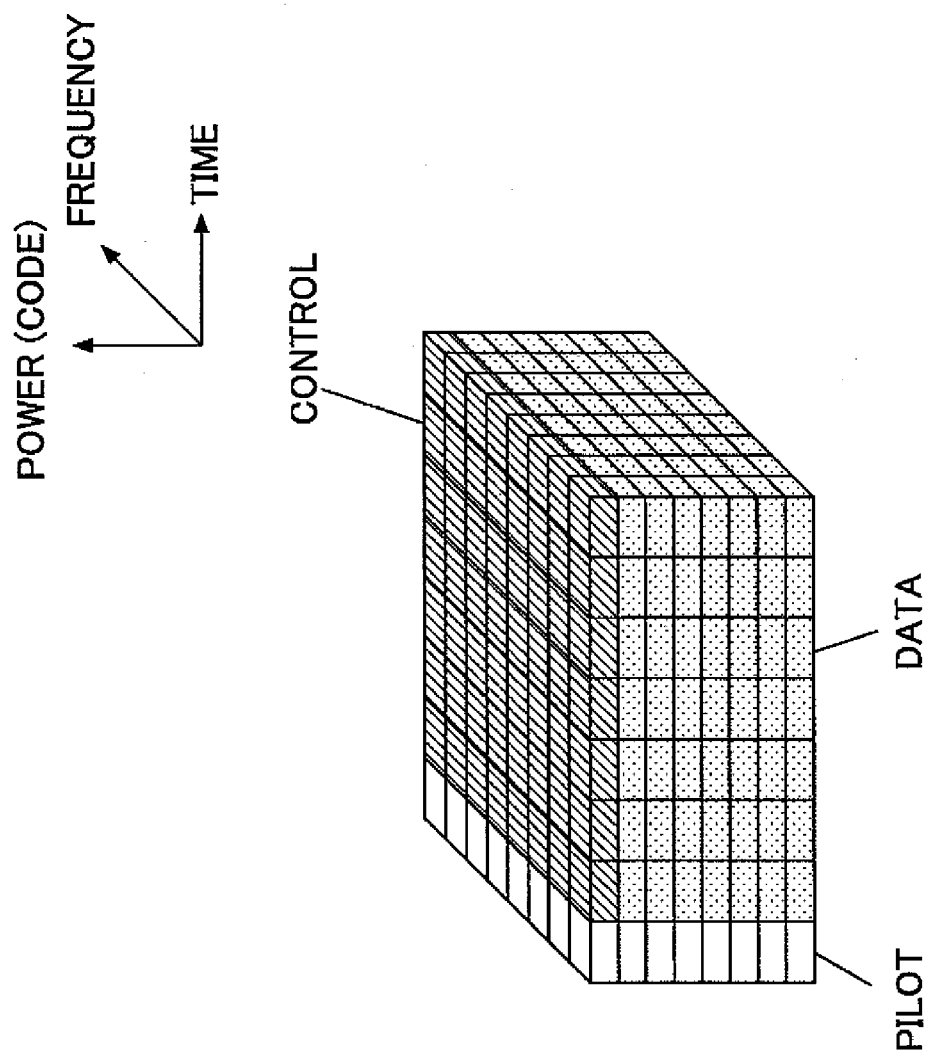
FIG. 13A and FIG. 13B are diagrams exemplifying multiplexing schemes (part four) of the pilot channel, the control channel, and the data channel.
Figure 13B:
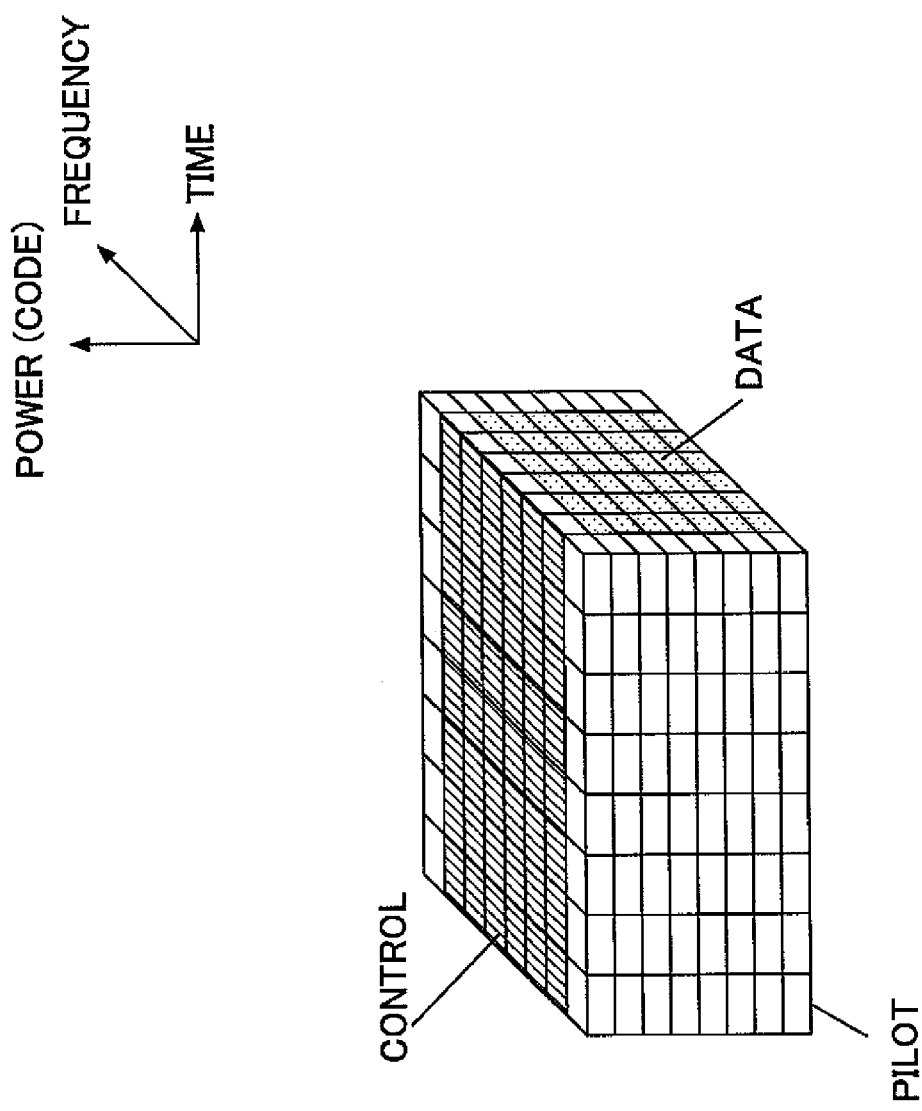

FIG. 13A and FIG. 13B are diagrams exemplifying multiplexing schemes (part four) of the pilot channel, the control channel, and the data channel.

Specifically, FIG. 13A illustrates time multiplexing of the pilot channel, the control channel, and the data channel, and code multiplexing of the control channel and the data channel.

FIG. 13B illustrates frequency multiplexing of the pilot channel, the control channel, and the data channel, and code multiplexing of the control channel and the data channel.

Figure 14A:
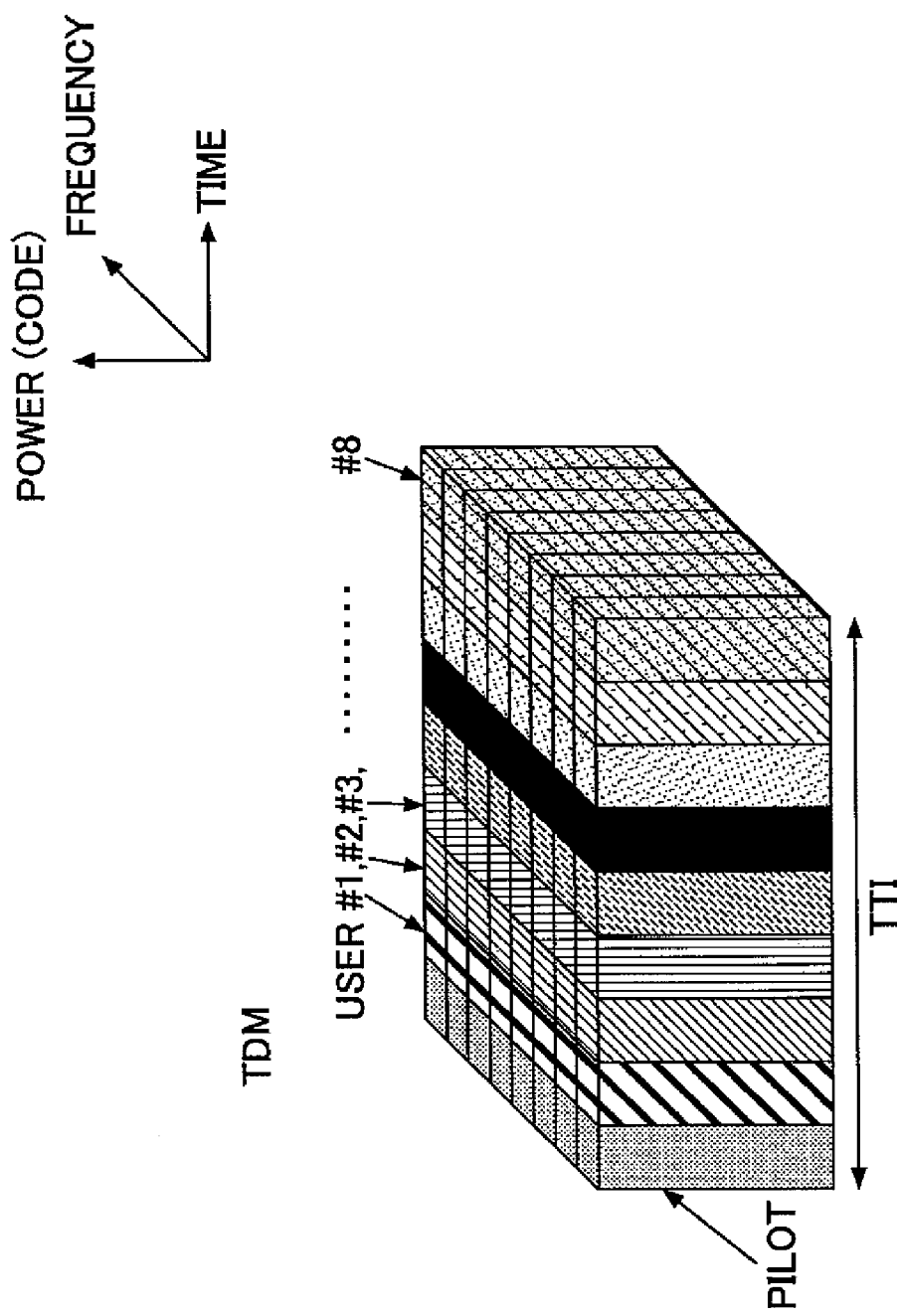
FIG. 14A through FIG. 14C are diagrams exemplifying multiplexing schemes (part one) of the data channel.
Figure 14B:
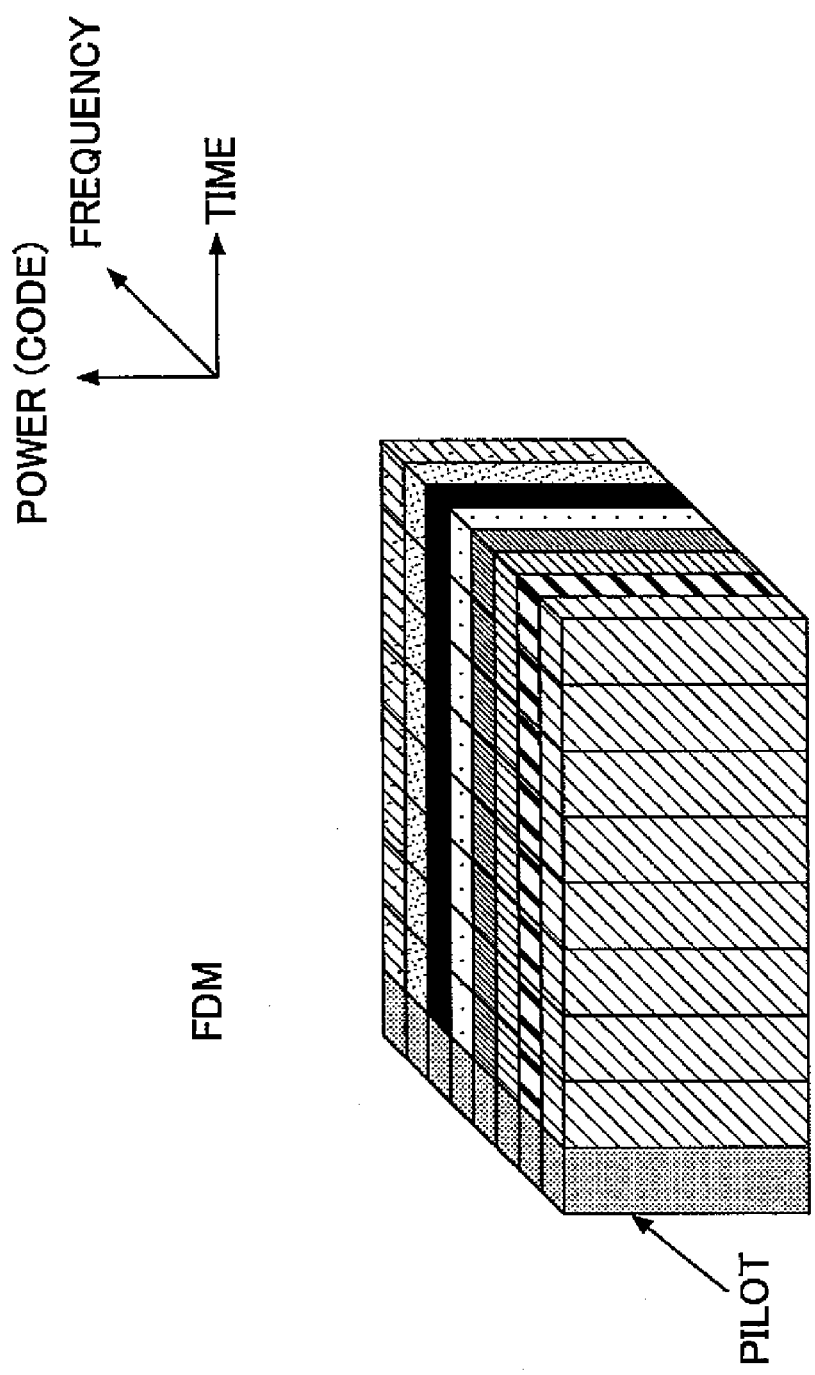
Figure 14C:
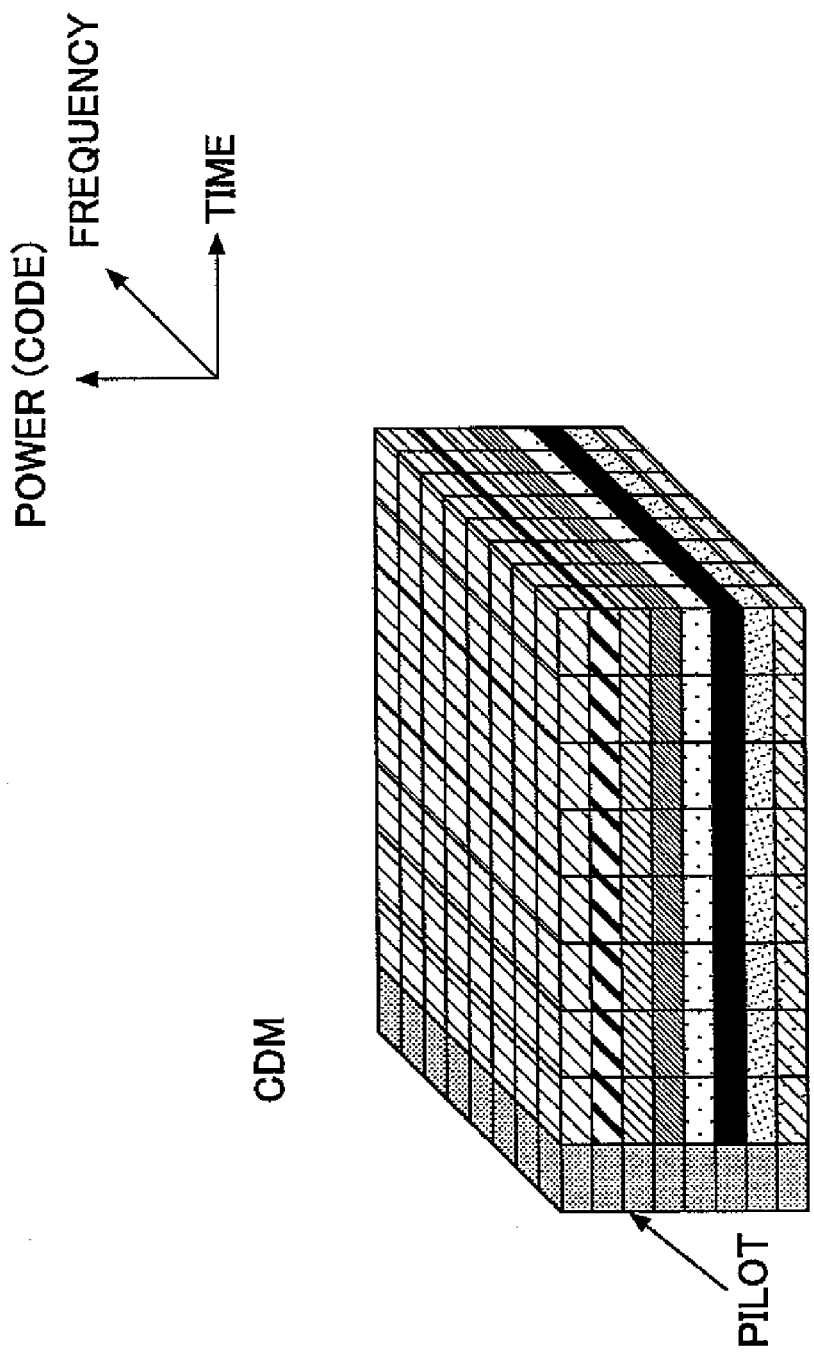

FIG. 14A through FIG. 14C are diagrams exemplifying multiplexing schemes (part one) of the data channel.

In order to efficiently utilize the radio resources, the data channel in one packet is shared by plural users. The period for transmitting one packet is referred to as "transmission time interval (TTI)", and for example, TTI may be a period as short as 0.5 ms. In addition, the data channel in one packet can be shared through plural types of data channels for voice data, image data, and others, or through multiplexing of traffic data having different quality of service (QoS). For simplicity, it is exemplified below that the data channel is shared by plural users.

FIG. 14A is a diagram illustrating that the data channel is shared by users through Time Division Multiplexing (TDM). Since fading in the time direction is small when TTI is short, this method is preferable from the point of view of reducing influence of fading in the frequency and time directions.

FIG. 14B is a diagram illustrating that the data channel is shared by users through Frequency Division Multiplexing (FDM).

FIG. 14C is a diagram illustrating that the data channel is shared by users through Code Division Multiplexing (CDM).

Figure 15A:
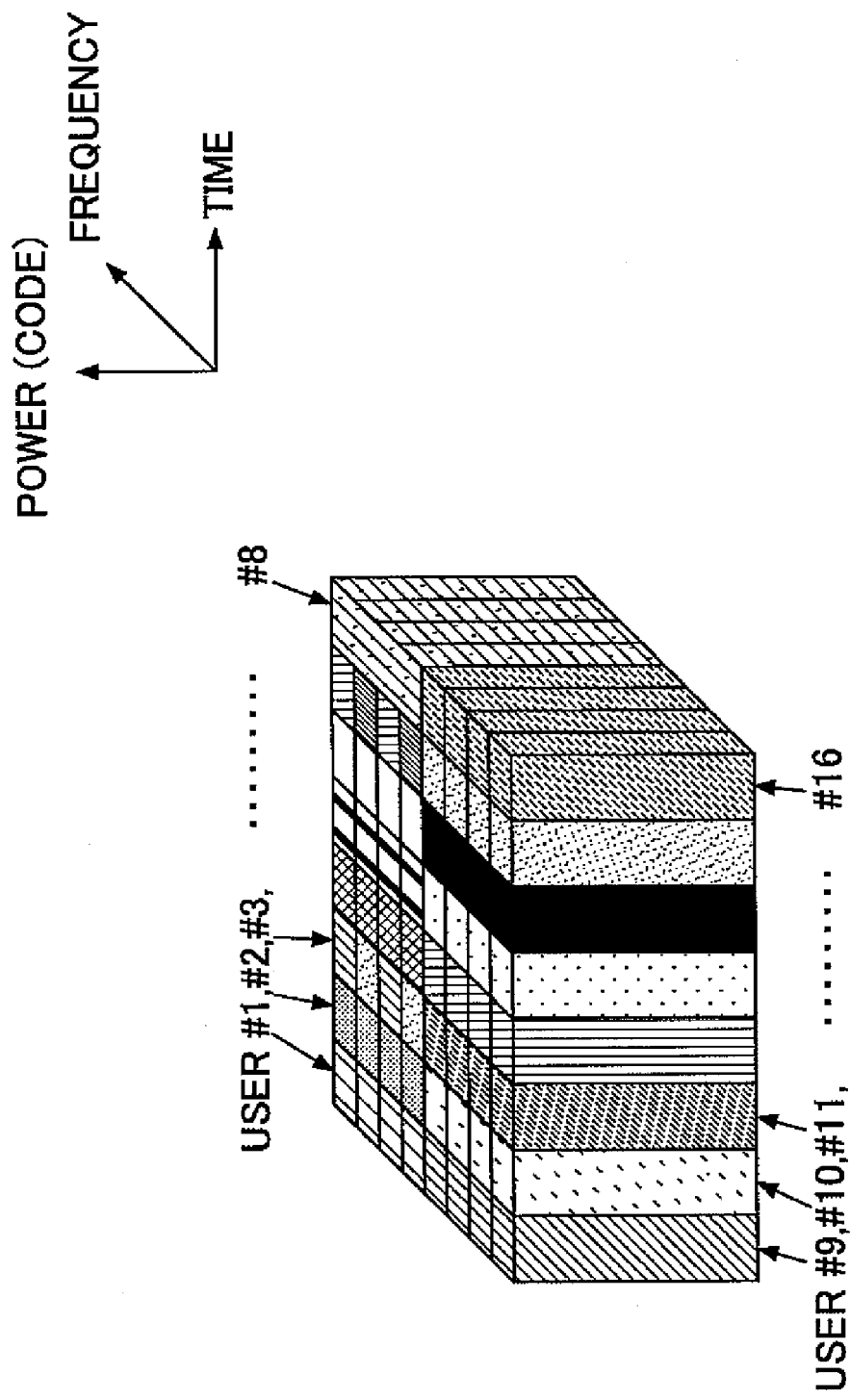

FIG. 15A and FIG. 15B are diagrams exemplifying multiplexing schemes (part two) of the data channel.

FIG. 15A is a diagram illustrating that the data channel is shared by users through Time Division Multiplexing (TDM) and Frequency Division Multiplexing (FDM). It should be noted that for purposes of simplicity, the pilot channel and the control channel are not illustrated.

In FIG. 15A, two types of blocks are shown in the frequency direction, and eight types of blocks are shown in the time direction. For example, among 100 sub-carriers, the first half (50 sub-carriers) and the second half (50 sub-carriers) of the 100 sub-carriers may be used separately.

FIG. 15B is a diagram illustrating that interleaving is further carried out in the frequency direction.

Since the data channel of each user is distributed broadly in the frequency direction, a large interleaving effect (diversity effect) is obtainable.

Figure 16B:
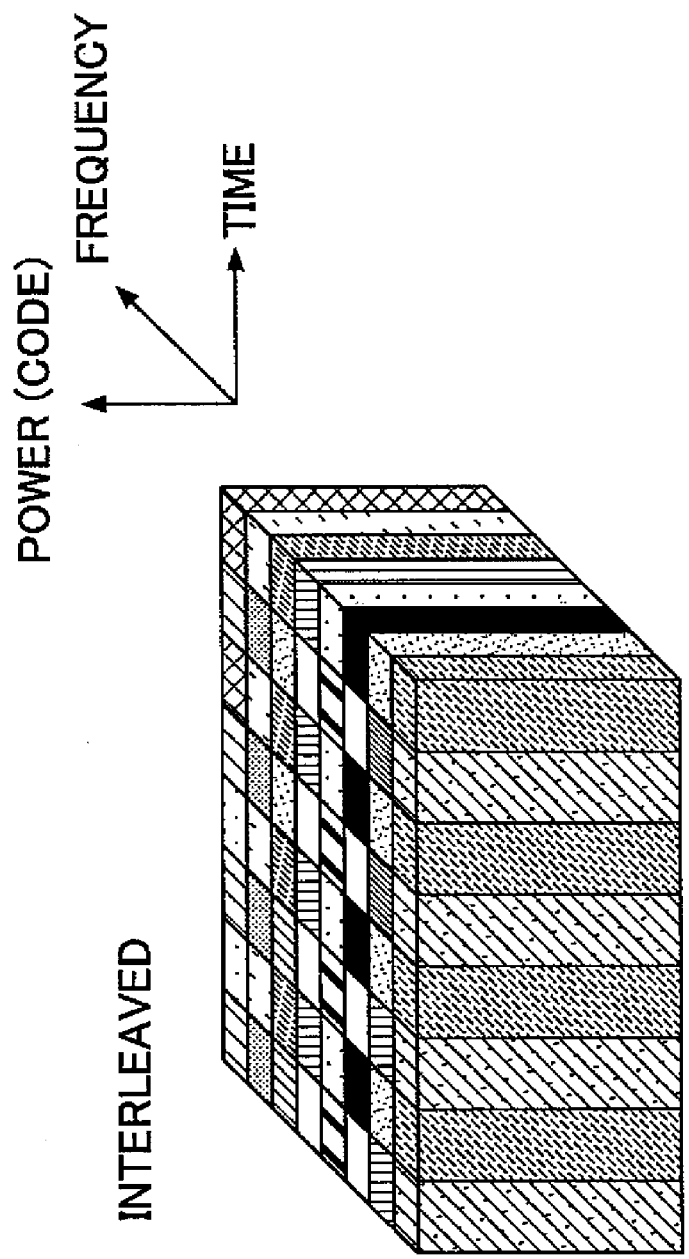
Figure 16C:
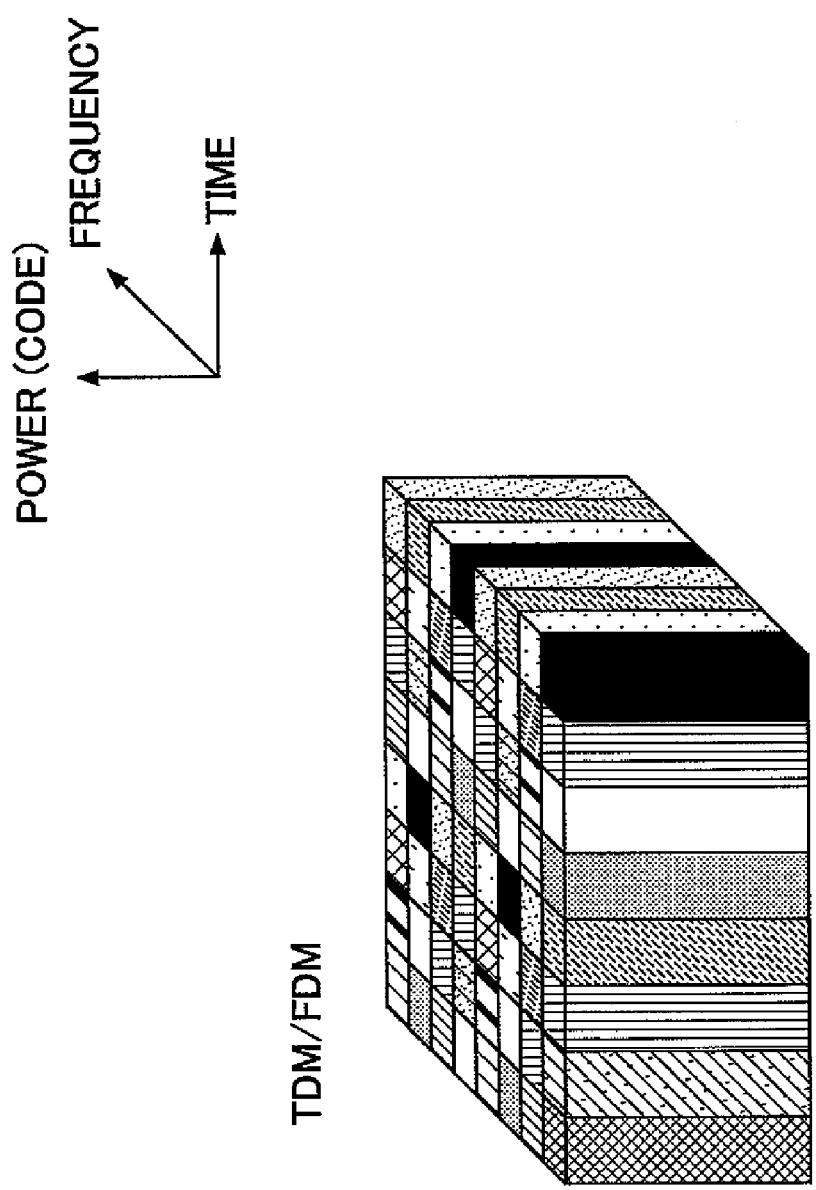

FIG. 16A through FIG. 16C are diagrams exemplifying multiplexing schemes (part three) of the data channel.

FIG. 16A is a diagram illustrating that the data channel is shared by users through Time Division Multiplexing (TDM) and Frequency Division Multiplexing (FDM). In FIG. 16A, two types of blocks are shown in the frequency direction, and eight types of blocks are shown in the time direction. For example, the first half and the second half of the whole period of the data channel may be used separately.

FIG. 16B is a diagram illustrating that interleaving is further carried out in the time direction (the order in the frequency direction is set unchanged).

FIG. 16C is a diagram illustrating that interleaving is carried out with any pattern in the time-frequency two dimensional region.

FIG. 17A through FIG. 17D are diagrams exemplifying multiplexing schemes (part four) of the data channel.

Figure 17A:
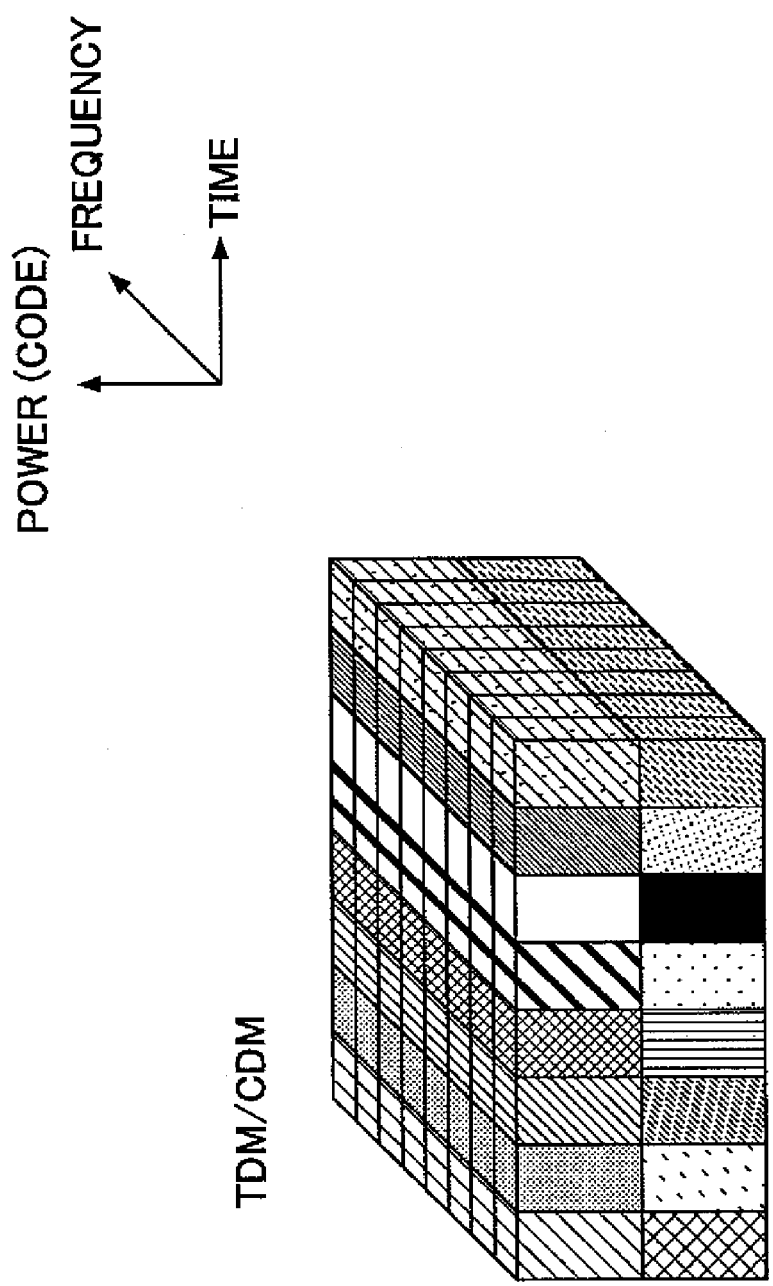
FIG. 17A through FIG. 17D are diagrams exemplifying multiplexing schemes (part four) of the data channel.

Specifically, FIG. 17A is a diagram illustrating that the data channel is shared by users through Time Division Multiplexing (TDM) and Code Division Multiplexing (CDM). In FIG. 17A, two types of blocks are shown in the code direction, and eight types of blocks are shown in the time direction.

Figure 17B:
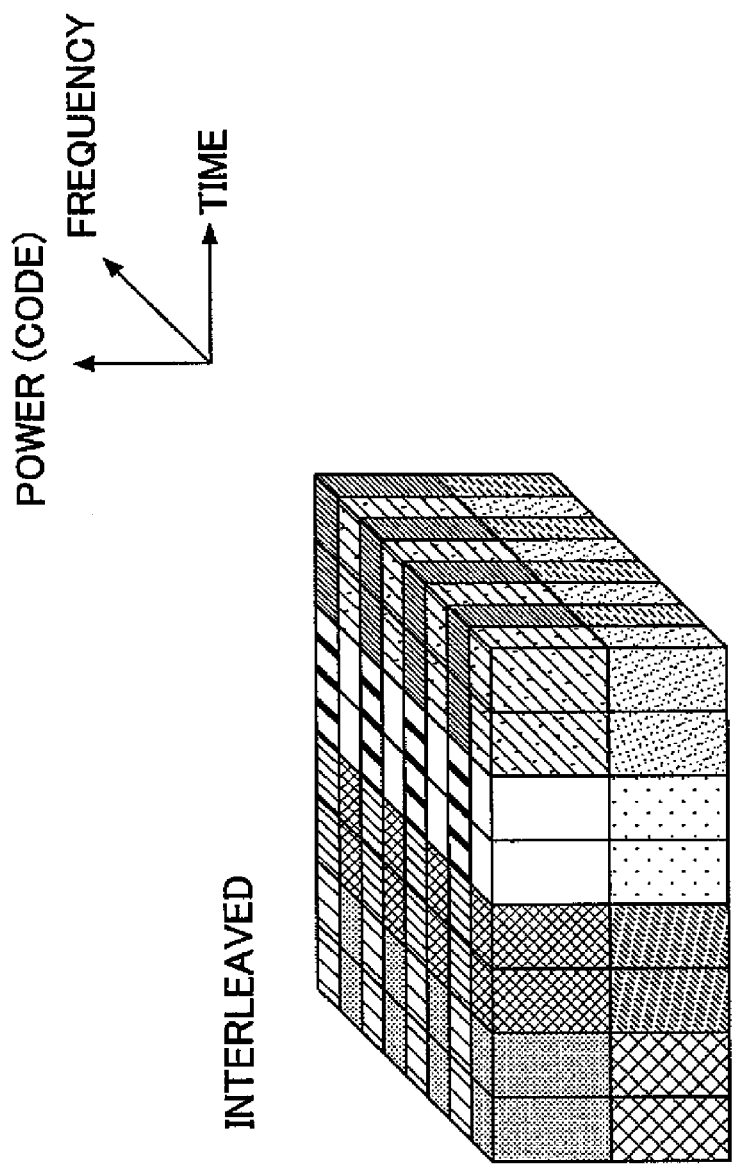

FIG. 17B is a diagram illustrating that interleaving is further carried out.

Figure 17C:
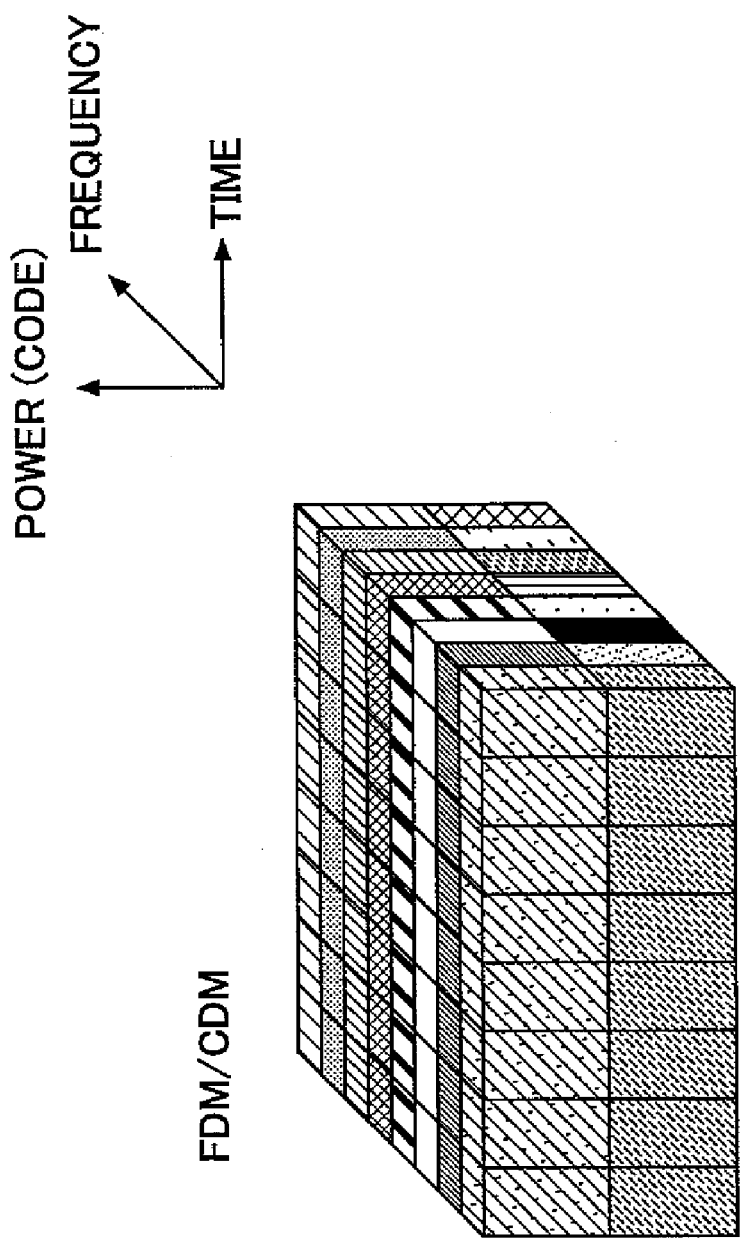

FIG. 17C is a diagram illustrating that the data channel is shared by users through Frequency Division Multiplexing (FDM) and Code Division Multiplexing (CDM).

Figure 17D:
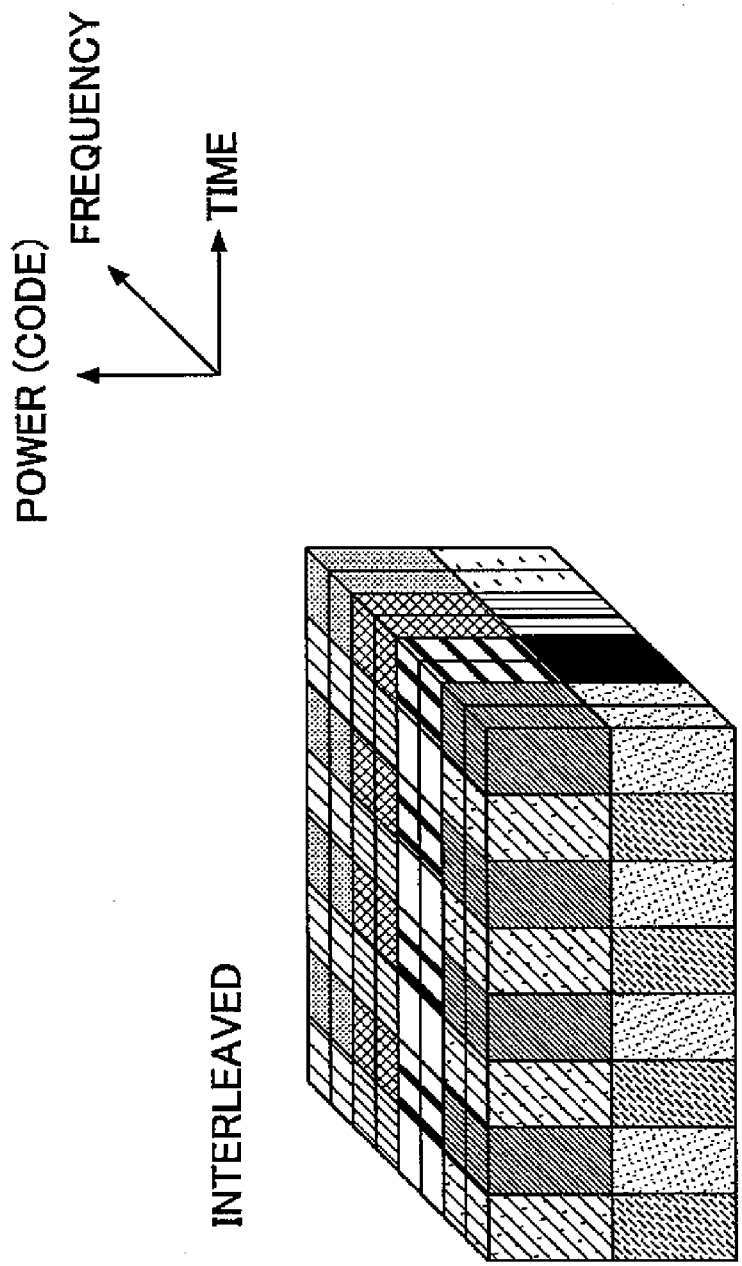

FIG. 17D is a diagram illustrating that interleaving is further carried.

Figure 18A:
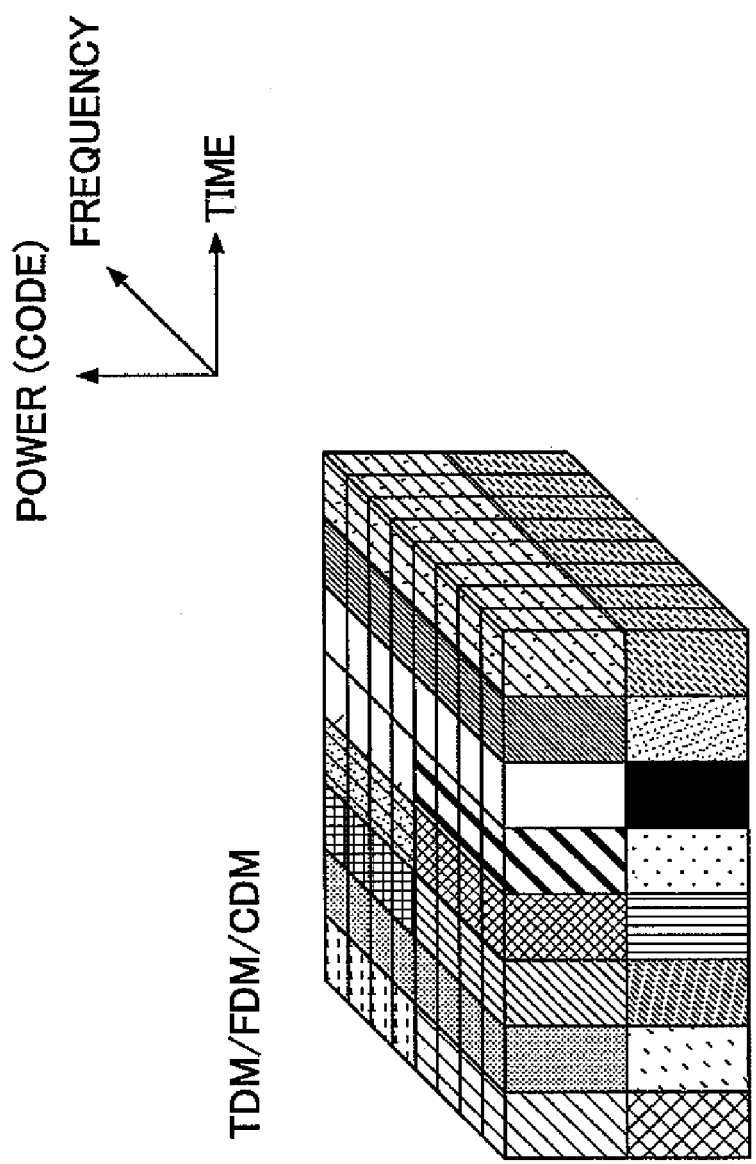
FIG. 18A and FIG. 18B are diagrams exemplifying multiplexing schemes (part five) of the data channel.
Figure 18B:
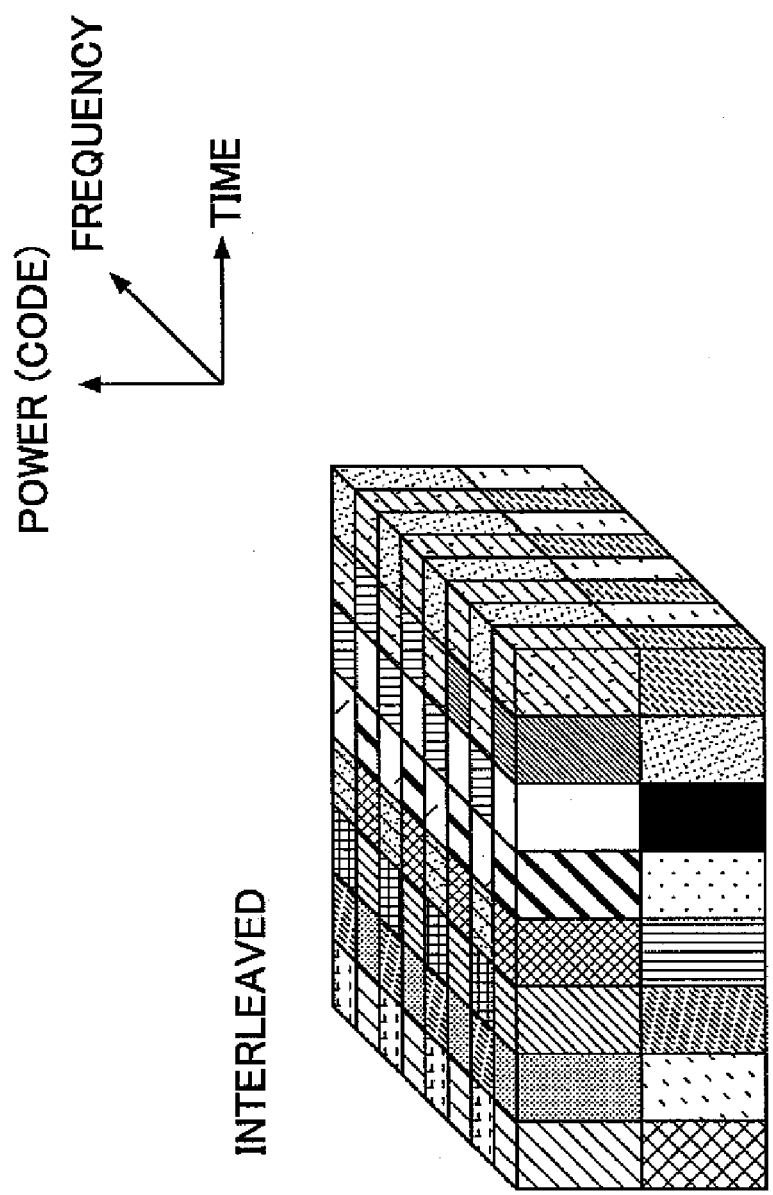

FIG. 18A and FIG. 18B are diagrams exemplifying multiplexing schemes (part five) of the data channel.

Specifically, FIG. 18A is a diagram illustrating that the data channel is shared by users through Time Division Multiplexing (TDM), Frequency Division Multiplexing (FDM), and Code Division Multiplexing (CDM). In FIG. 18A, two types of blocks are shown in each of the frequency direction and the code direction, and eight types of blocks are shown in the time direction.

FIG. 18B is a diagram illustrating that interleaving is further carried out.

While the invention has been described with reference to preferred embodiments, the invention is not limited to these embodiments, but numerous modifications could be made thereto without departing from the basic concept and scope described in the claims.

In addition, when necessary, two or more embodiments can be implemented together.

This international application is based on Japanese priority patent application No. 2005-106911 filed on Apr. 1, 2005, the entire contents of which are hereby incorporated by reference.

The invention claimed is:

1. A transmission device comprising:
a generating unit that generates a transmission signal in which a data channel and a dedicated pilot channel for each mobile terminal are code-multiplexed, and the data and dedicated pilot channels and a common pilot channel common to mobile terminals within a cell are time-multiplexed; and
a transmitting unit that transmits the transmission signal to a mobile terminal; wherein:
a duration of the dedicated pilot channel is longer than a duration of the common pilot channel;
the data channel is transmitted by using one of a multi-beam and a variable directional beam, said multi-beam including a plurality of fixed directional beams having respective fixed directions different from each other, said variable directional beam being of a direction changing along with a position of a mobile terminal;

the dedicated pilot channel is transmitted by using the variable directional beam; and the common pilot channel is transmitted by using the multi-beam.

2. The transmission device as claimed in the claim 1, wherein a weighting factor for use of the variable directional beam is adaptively calculated according to the position of the mobile terminal.

3. The transmission device as claimed in the claim 1, wherein the variable directional beam is generated by switching one or more of the fixed directional beams.

4. A transmission method comprising steps of:

generating a transmission signal in which a data channel and a dedicated pilot channel for each mobile terminal are code-multiplexed, and the data and dedicated pilot channels and a common pilot channel common to mobile terminals within a cell are time-multiplexed; and transmitting the transmission signal to a mobile terminal; wherein a duration of the dedicated pilot channel is longer than a duration of the common pilot channel;

the data channel is transmitted by using one of a multi-beam and a variable directional beam, said multi-beam including a plurality of fixed directional beams having respective fixed directions different from each other, said variable directional beam being of a direction changing along with a position of a mobile terminal;

the dedicated pilot channel is transmitted by using the variable directional beam; and the common pilot channel is transmitted by using the multi-beam.

5. The transmission method as claimed in the claim 4, wherein a weighting factor for use of the variable directional beam is adaptively calculated according to the position of the mobile terminal.

6. The transmission method as claimed in the claim 4, wherein

The variable directional beam is generated by switching one or more of the fixed directional beams.

* * * * *